(12) United States Patent
Hirai

(10) Patent No.: US 8,040,432 B2
(45) Date of Patent: Oct. 18, 2011

(54) INFORMATION PROCESSING EQUIPMENT, METHOD, PROVISION SYSTEM AND COMPUTER PROGRAM PRODUCT THAT SYNTHESIZES CONTENT BY ADOPTING A MEAN VALUE

(75) Inventor: Jun Hirai, Tokyo (JP)

(73) Assignee: Sony Corporation, Tokyo (JP)

( * ) Notice: Subject to any disclaimer, the term of this patent is extended or adjusted under 35 U.S.C. 154(b) by 1412 days.

(21) Appl. No.: 11/515,016

(22) Filed: Sep. 5, 2006

(65) Prior Publication Data

US 2007/0058077 A1 Mar. 15, 2007

(30) Foreign Application Priority Data

Sep. 14, 2005 (JP) ................................. 2005-266293

(51) Int. Cl.
*H04N 7/01* (2006.01)

(52) U.S. Cl. ........ 348/441; 348/452; 348/448; 348/446; 348/458; 348/459; 382/300

(58) Field of Classification Search .................. 348/441, 348/446, 448, 452, 451, 561, 704, 458, 459; 382/300, 298, 299
See application file for complete search history.

(56) References Cited

U.S. PATENT DOCUMENTS

| 5,666,164 A | 9/1997 | Kondo et al. |
| 6,489,998 B1 * | 12/2002 | Thompson et al. ............ 348/452 |
| 7,240,128 B2 * | 7/2007 | Kondo et al. .................... 710/16 |

FOREIGN PATENT DOCUMENTS

| JP | 3321915 | 6/2002 |
| JP | 2002-223437 | 8/2002 |
| JP | 2002-262059 | 9/2002 |
| JP | 2005-109707 | 4/2005 |

* cited by examiner

*Primary Examiner* — Michael Lee
*Assistant Examiner* — Jean W Desir
(74) *Attorney, Agent, or Firm* — Oblon, Spivak, McClelland, Maier & Neustadt, L.L.P.

(57) ABSTRACT

Disclosed are information processing equipment and an information processing method, a provision system and method, and a program that are intended to readily produce a content of higher quality, wherein, an acquisition unit acquires an interpolative content with which a main content is interpolated in a spatial or temporal direction or with which gray levels into which the main content is quantized are interpolated, and, a synthesis unit synthesizes the main content and interpolative content so that the first content will be interpolated in the spatial or temporal direction or the gray levels into which the first content is quantized will be interpolated.

21 Claims, 24 Drawing Sheets

INFORMATION PROCESSING EQUIPMENT, METHOD, PROVISION SYSTEM AND COMPUTER PROGRAM PRODUCT THAT SYNTHESIZES CONTENT BY ADOPTING A MEAN VALUE

CROSS-REFERENCES TO RELATED APPLICATIONS

The present invention contains subject matter related to Japanese Patent Application JP 2005-266293 filed in the Japanese Patent Office on Sep. 14, 2005, the entire contents of which being incorporated herein by reference.

BACKGROUND OF THE INVENTION

1. Field of the Invention

The present invention relates to information processing equipment and an information processing method, a provision system and method, and a program. More particularly, the present invention is concerned with information processing equipment and an information processing method, a provision system and method, and a program which process or provide a content.

2. Description of the Related Art

Nowadays, various programs are broadcasted according to the standard-definition television (SDTV) or high-definition television (HDTV) standard.

The programs are often so-called rebroadcasted.

According to the HDTV standard, the interlaced scanning is adopted for providing a maximum number of pixels in a 1080i format defining that the number of effective pixels equals a product of 1920 by 1080. When signal processing is applied to a signal formed in the 1080i format, an image conformable to the progressive scanning can be produced using the same number of effective pixels.

According to related arts, image signal converters convert a picture signal exhibiting a standard resolution into a picture signal exhibiting a high resolution. Herein, an image signal converter includes: a means for classifying an input picture signal, which exhibits the standard resolution, on the basis of the shape of a three-dimensional distribution of the signal levels; a storage device that holds predictive coefficients, which are obtained in advance through learning, in association with classes; and a means that is coupled with the storage device and that works out an optimal estimated value through computation based on a predictive expression containing the predictive coefficient, and produces the picture signal, which exhibits the higher resolution than the input picture signal does, because the picture signal has come to encompass the estimated value (refer to, for example, Patent Document 1).

Patent Document 1: Japanese Unexamined Patent Publication No. 7-79418

SUMMARY OF THE INVENTION

However, the worth of rebroadcast is limited to the fact that the same program can be enjoyed at a different time instant.

For example, when signal processing is applied to a signal conformable to the 1080i format in order to produce a picture according to the progressive scanning method so that the number of effective pixels in the picture will equal a product of 1920 by 1080, that is, when a high-quality picture is produced by applying signal processing, especially if real-time processing is requested despite a limited throughput, the high-quality picture may end in failure.

present invention attempts to break through the foregoing situation, and is intended to readily provide a content of higher quality.

According to a first aspect of the present invention, there is provided information processing equipment including an acquisition unit that acquires a second content with which a first content is interpolated in a spatial or temporal direction or with which gray levels into which the first content is quantized are interpolated, and a synthesis unit that synthesizes the first content and second content so that the first content will be interpolated in the spatial or temporal direction or the gray scale into which the first content is quantized will be interpolated.

The acquisition unit acquires the second content that is a picture formed according to the interlaced scanning and made up of lines which alternate with adjacent lines constituting the first content that is a picture formed according to the interlaced scanning. The synthesis unit synthesizes the first content and second content by arranging the lines, which constitute the second content, alternately with the adjacent lines constituting the first content.

The acquisition unit acquires the second content that is quantized into reference gray levels different from reference gray levels into which the first content is quantized. The synthesis unit synthesizes the first content and second content by adopting a mean value between a value designated by a unit in which the first content is quantized and a value designated by a unit, in which the second content is quantized, as a value designated by a unit for quantization.

The acquisition unit acquires the second content made up of frames that alternate with adjacent frames constituting the first content. The synthesis unit synthesizes the first content and second content by arranging the associated frames, which constitute the second content, alternately with the adjacent frames constituting the first content.

The acquisition unit acquires the second content made up of pixels that alternate with adjacent pixels constituting the first content. The synthesis unit synthesizes the first content and second content by arranging the associated pixels, which constitute the second content, alternately with the adjacent pixels constituting the first content.

The acquisition unit acquires the second content by receiving the broadcasted second content.

A provision system that provides the second content may further include a transmitter that transmits a request for the second content over a network. The acquisition unit may acquire the second content by receiving the second content that is transmitted from the provision system over the network in response to the request.

The acquisition unit may acquire the second content by reading the second content from a recording medium in which the second content is recorded.

A decision making unit may be further included for deciding on the basis of information, which signifies the association of the first content and second content with each other and is appended to each of the first content and second content, whether the first content and second content have been acquired. If a decision is made that the first content and second content have been acquired, the synthesis unit may synthesize the first content and second content.

According to the first aspect of the present invention, there is provided an information processing method including a step of acquiring a second content with which a first content is interpolated in a spatial or temporal direction or with which gray levels into which the first content is quantized are interpolated, and a step of synthesizing the first content and second content and thereby causing the first content to be interpolated in the spatial or temporal direction or the gray levels into which the first content is quantized to be interpolated.

According to the first aspect of the present invention, there is provided a program allowing a computer to execute a step of acquiring a second content with which a first content is interpolated in a spatial or temporal direction or with which gray levels into which the first content is quantized are interpolated, and a step of synthesizing the first content and second content and thereby causing the first content to be interpolated in the spatial or temporal direction or the gray levels into which the first content is quantized to be interpolated.

According to the first aspect of the present invention, the second content with which the first content is interpolated in the spatial or temporal direction or with which gray levels into which the first content is quantized are interpolated is acquired. The first content and second content are synthesized so that the first content will be interpolated in the spatial or temporal direction or the gray levels into which the first content is quantized will be interpolated.

According to a second aspect of the present invention, there is provided a provision system including a production unit that produces a second content with which a first content is interpolated in a spatial or temporal direction or with which gray levels into which the first content is quantized are interpolated, and a provision unit that provides information processing equipment, which synthesizes the first content and second content and thereby causing the first content to be interpolated in the spatial or temporal direction or the gray levels into which the first content is quantized to be interpolated, with the second content.

The production unit may produce the second content by sampling every other line out of lines constituting a picture formed according to the progressive scanning.

The production unit may produce the second content by quantizing a picture into reference gray levels different from reference gray levels into which the first content is quantized.

The production unit may produce the second content by sampling every other frame out of frames constituting a picture.

The production unit may produce the second content by sampling every other pixel out of pixels constituting a picture.

The provision unit may provide the information processing equipment with the second content by broadcasting the second content.

A receiver may be further included for receiving a request for the second content that is transmitted from the information processing equipment over a network. The provision unit may provide the information processing equipment with the second content by transmitting the second content over the network in response to the request.

The provision unit may provide the information processing equipment with the second content by recording the second content in a recording medium that is read by the information processing equipment.

An appending unit may be further included for appending information, which signifies the association with the first content, to the second content.

According to the second aspect of the present invention, there is provided a provision method including a step of producing a second content with which a first content is interpolated in a spatial or temporal direction or with which gray levels into which the first content is quantized are interpolated, and a step of providing information processing equipment, which synthesizes the first content and second content and thereby causing the first content to be interpolated in the spatial or temporal direction or the gray levels into which the first content is quantized to be interpolated, with the second content.

According to the second aspect of the present invention, there is provided a program allowing a computer to execute a step of producing a second content with which a first content is interpolated in a spatial or temporal direction or with which gray levels into which the first content is quantized are interpolated, and a step of providing information processing equipment, which synthesizes the first content and second content and thereby causing the first content to be interpolated in the spatial or temporal direction or the gray levels into which the first content is quantized to be interpolated, with the second content.

According to the second aspect of the present invention, the second content with which the first content is interpolated in the spatial or temporal direction or with which the gray levels into which the first content is quantized are interpolated is produced. The information processing equipment that synthesizes the first content and second content so that the first content will be interpolated in the spatial or temporal direction or the gray levels into which the first content is quantized will be interpolated is provided with the second content.

As mentioned above, according to the first aspect of the present invention, a content can be produced.

Moreover, according to the first aspect of the present invention, a content of higher quality can be produced.

According to the second aspect of the present invention, a content can be provided.

Moreover, according to the second aspect of the present invention, information processing equipment can readily produce a content of higher quality.

BRIEF DESCRIPTION OF THE DRAWINGS

Embodiments of the present invention will be described in detail based on the following figures, wherein.

DESCRIPTION OF THE PREFERRED EMBODIMENTS

Figure 1:
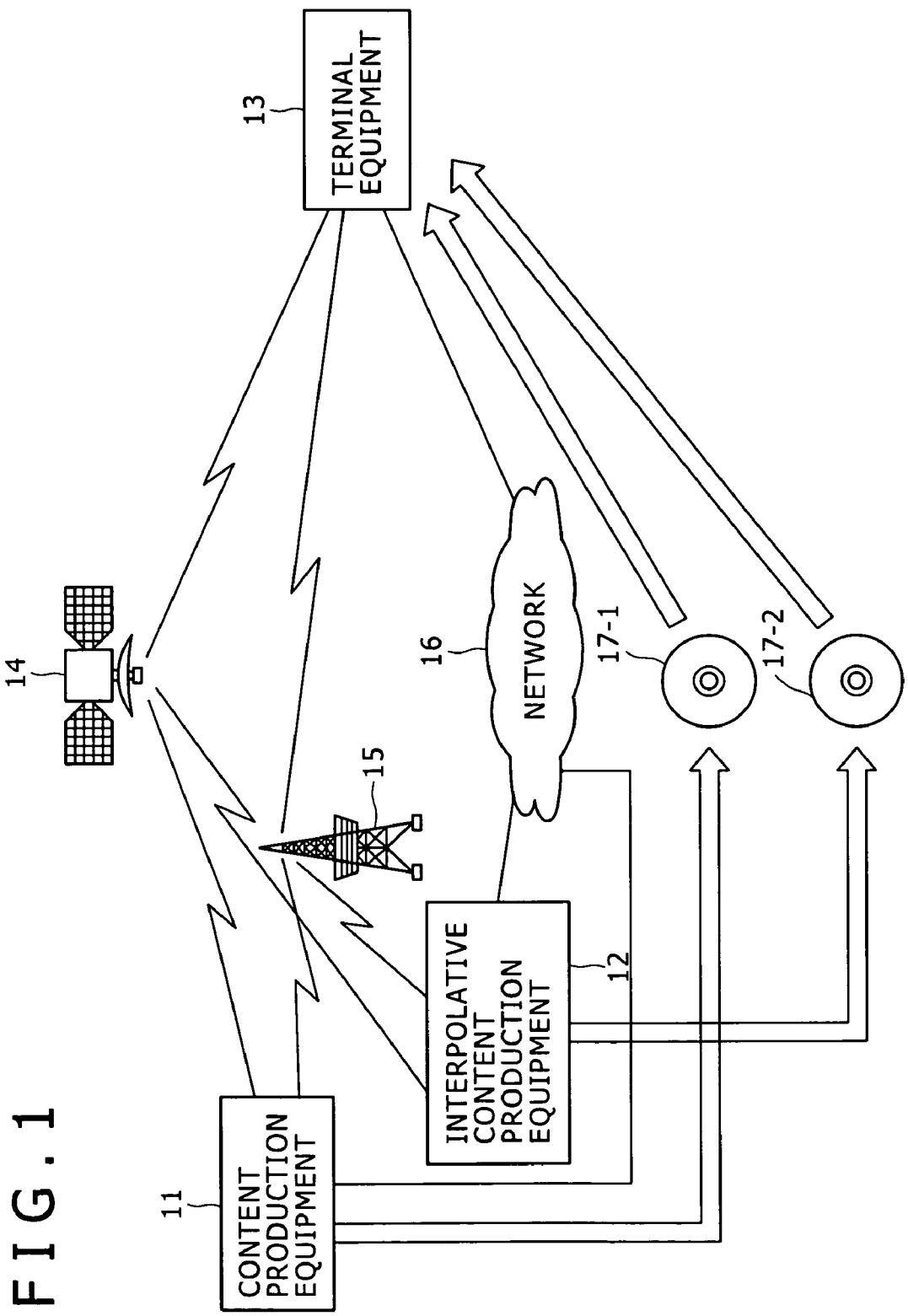
FIG. 1 is a block diagram showing an embodiment of a content provision system in accordance with the present invention.

Embodiments of the present invention will be described below. To begin with, the relationship of association between the constituent features of the present invention and the embodiments to be described later will be presented below. This is intended to verify that the embodiments of the present invention will be described in Description of the Preferred Embodiment. An embodiment that is described in Description of the Preferred Embodiment may not be mentioned to correspond to a specific constituent feature of the present invention. However, this does not mean that the embodiment does not correspond to the specific constituent feature. Moreover, even if an embodiment is mentioned to correspond to a specific constituent feature, it does not mean that the embodiment does not correspond to any constituent feature other than the specific constituent feature.

Information processing equipment in accordance with the first embodiment of the present invention includes an acquisition unit (for example, an acquisition unit 31 shown in FIG. 2) that acquires a second content with which a first content is interpolated in a spatial or temporal direction or with which gray levels into which the first content is quantized are interpolated, and a synthesis unit (for example, a synthesis unit 32 shown in FIG. 2) that synthesizes the first content and second content so that the first content will be interpolated in the spatial or temporal direction or the gray levels into which the first content is quantized will be interpolated.

A provision system that provides the second content further includes a transmitter (for example, a transmitter 121 shown in FIG. 13) which transmits a request for the second content over a network. The acquisition unit may acquire the second content by receiving the second content which is transmitted from the provision system over the network in response to the request.

A decision making means (for example, a control unit 111 shown in FIG. 13) may be further included for deciding on the basis of information, which signifies the association of the first content and second content with each other and is appended to each of the first content and second content, whether the first content and second content have been acquired. If a decision is made that the first content and second content have been acquired, the synthesis unit may synthesize the first content and second content.

An information processing method or a program in accordance with the first embodiment of the present invention includes a step (for example, step S162 in FIG. 14) of acquiring a second content with which a first content is interpolated in a spatial or temporal direction or with which gray levels into which the first content quantized are interpolated, and a step (for example, step S185 in FIG. 15) of synthesizing the first content and second content and thereby causing the first content to be interpolated in the spatial or temporal direction or the gray levels into which the first content is quantized to be interpolated.

A provision system in accordance with the second embodiment of the present invention includes a production means (for example, a segmentation unit 71 shown in FIG. 8) that produces a second content with which a first content is interpolated in a spatial or temporal direction or with which gray levels into which the first content is quantized are interpolated, and a provision unit (for example, a content delivery unit 22 shown in FIG. 2) that provides information processing equipment, which synthesizes the first and second content so that the first content will be interpolated in the spatial or temporal direction or the gray levels into which the first content is quantized will be interpolated, with the second content.

A receiver (for example, a receiver 81 shown in FIG. 8) may be further included for receiving a request for the second content which is transmitted from the information processing equipment over the network. The provision unit may provide the information processing equipment with the second content by transmitting the second content over the network in response to the request.

An appending unit (for example, a metadata appending unit 72 shown in FIG. 8) may be further included for appending information, which signifies the association with the first content, to the second content.

A provision method or a program in accordance with the second embodiment of the present invention includes a step (for example, step S82 mentioned in FIG. 9) of producing a second content with which a first content is interpolated in a spatial or temporal direction or with which gray levels into which the first content is quantized are interpolated, and a step (for example, step S84 mentioned in FIG. 9) of providing information processing equipment, which synthesizes the first and second contents so that the first content will be interpolated in the spatial or temporal direction or the gray levels into which the first content is quantized will be interpolated, with the second content.

FIG. 1 is a block diagram showing an embodiment of a content provision system in accordance with the present invention. The content provision system includes content production equipment 11, interpolative content production equipment 12, terminal equipment 13, an artificial satellite 14, transmission equipment 15, a network 16, and recording media 17-1 and 17-2.

The content production equipment 11 is controlled and operated by a content producing person, and produces a content. The content production equipment 11 broadcasts the produced content through satellite broadcasting involving the artificial satellite 14 or so-called terrestrial broadcasting involving the transmission equipment 15.

Incidentally, what is referred to as a content is information significant to users such as a picture, sounds, or data. A description will be made below by taking a content that is a picture for instance.

The content production equipment 11 may transmit a produced content to the terminal equipment 13 over the network 16. Furthermore, the content production equipment 11 may record the produced content in the recording medium 17-1. The content recorded in the recording medium 17-1 is read by the terminal equipment 13 into which the recording medium 17-1 is loaded.

Hereinafter, a content with which the terminal equipment 13 is provided by the content production equipment 11 through broadcasting, communication, or the recording medium 17-1 shall be referred to as a main content.

The interpolative content production equipment 12 produces a content with which a main content is interpolated in a spatial or temporal direction or with which gray levels into which the main content is quantized are interpolated. The interpolative content production equipment 12 provides the terminal equipment 13 with the produced content.

Hereinafter, a content provided by the interpolative content production equipment 12 shall be referred to as an interpolative content.

The interpolative content production equipment 12 broadcasts a produced interpolative content through satellite broadcasting involving the artificial satellite 14 or terrestrial broadcasting involving the transmission equipment 15.

The interpolative content production equipment 12 may transmit a produced interpolative content to the terminal equipment 13 over the network 16. Moreover, the interpolative content production equipment 12 may record the produced interpolative content in the recording medium 17-2. The content recorded in the recording medium 17-2 is read by the terminal equipment 13 into which the recording medium 17-2 is loaded.

The terminal equipment 13 is realized as, for example, a stationary video recorder or personal computer. The terminal equipment 13 receives a broadcasted main content or interpolative content. The terminal equipment 13 receives the main content or interpolative content sent over the network 16. Otherwise, the terminal equipment 13 reads the main content from the loaded recording medium 17-1 and reads the interpolative content from the loaded recording medium 17-2.

The terminal equipment 13 synthesizes a main content and interpolative content that are broadcasted or transmitted or read from the recording medium 17-1 or 17-2.

The network 16 is a transmission line realized with a wired or wireless ordinary or leased line, a local area network (LAN), or the Internet.

The recording medium 17-1 or 17-2 is a so-called removable medium such as a magnetic disk, an optical disk, a magneto-optical disk, or a semiconductor memory. More particularly, the recording medium 17-1 or 17-2 is a digital versatile disk (DVD), a Blu-ray disk®, a compact disk (CD), or a super-audio CD® (SACD). The recording medium 17-1 or 17-2 may be of the same type or of different types.

Hereinafter, when the recording medium 17-1 and recording medium 17-2 need not be discriminated from each other, the recording media will be called recording media 17.

Figure 2:
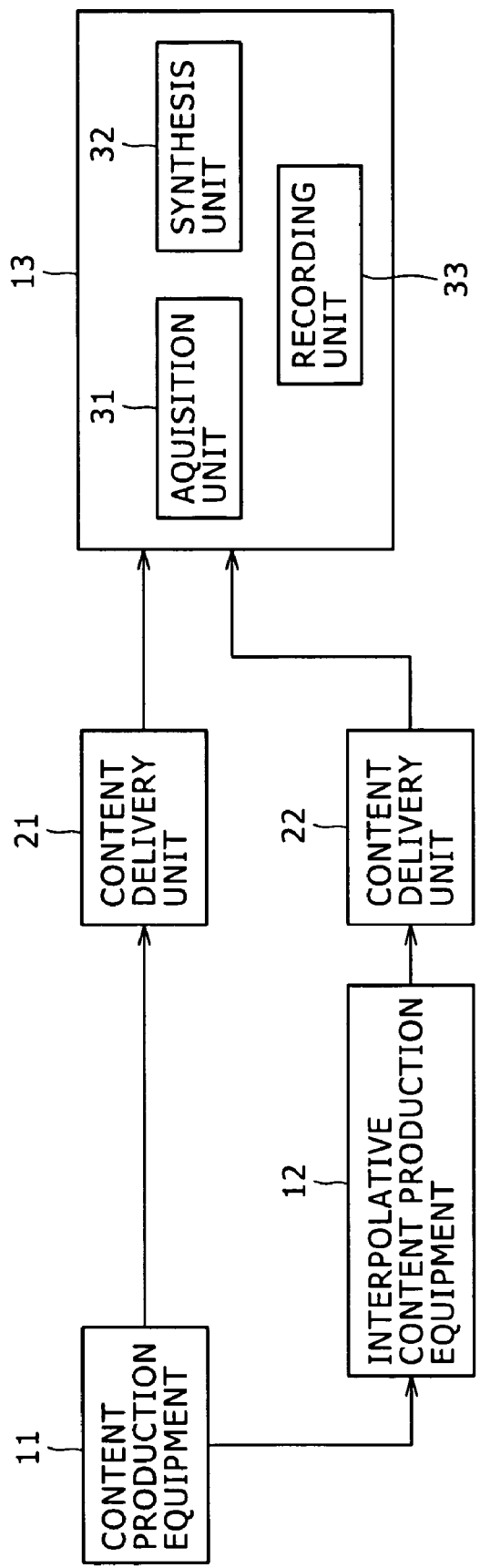
FIG. 2 is a block diagram showing a more concrete configuration of the content provision system.

FIG. 2 is a block diagram showing a more concrete configuration of the content provision system. A content delivery unit 21 and a content delivery unit 22 deliver (provide) a main content or an interpolative content to the terminal equipment 13. The content delivery unit 21 and content delivery unit 22 correspond to interfaces that give a link with the artificial satellite 14, transmission equipment 15, or network 16 or recording apparatuses that record data in the recording medium 17-1 or 17-2. The content delivery unit 21 and content delivery unit 22 may be included independently of the content production equipment 11 or interpolative content production equipment 12 or may be integrated with the content production equipment 11 or interpolative content production equipment 12.

The content delivery unit 21 provides the terminal equipment 13 with a main content produced by the content production equipment 11.

To be more specific, when a main content is provided through broadcasting, the content delivery unit 21 may be said to be equivalent to a transmission path for broadcasting which includes as components transmission equipment installed in a broadcasting station and the artificial satellite 14 or transmission equipment 15. Moreover, when a main content is provided through communication, the content delivery unit 21 may be said to be equivalent to a transmission path for communication which includes as components thereof a network interface and the network 16.

Furthermore, when a main content is provided while being recorded in the recording medium 17-1, the content delivery unit 21 may be said to be equivalent to a channel along which a recorder (not shown) that records the main content in the recording medium 17-1 and the recording medium 17-1 are delivered or distributed.

Likewise, when an interpolative content is provided through broadcasting, the content delivery unit 22 may be said to be equivalent to a transmission path for broadcasting which includes as components thereof transmission equipment installed in a broadcasting station and the artificial satellite 14 or transmission equipment 15. When the interpolative content is provided through communication, the content delivery unit 22 may be said to be equivalent to a transmission path for communication which includes as components thereof a network interface and the network 16.

When an interpolative content is provided while being recorded in the recording medium 17-2, the content delivery unit 22 may be said to be equivalent to a path along which a recorder (not shown) which records the interpolative content in the recording medium 17-2 and the recording medium 17-2 are delivered or distributed.

The terminal equipment 13 includes an acquisition unit 31, a synthesis unit 32, and a recording unit 33. The acquisition unit 31 acquires a main content or interpolative content by receiving the broadcasted main content or interpolative content. Otherwise, the acquisition unit 31 acquires the main content or interpolative content by receiving the transmitted main content or interpolative content.

Otherwise, the acquisition unit 31 acquires a main content or interpolative content by reading the main content or interpolative content from the recording medium 17-1 or 17-2 in which the main content or interpolative content is recorded.

The synthesis unit 32 synthesizes a main content and interpolative content so that the main content will be interpolated in a spatial or temporal direction or gray levels into which the main content is quantized will be interpolated.

The recording unit 33 records an acquired main content or interpolative content or records a content produced by synthesizing the main content and interpolative content.

Figure 3:
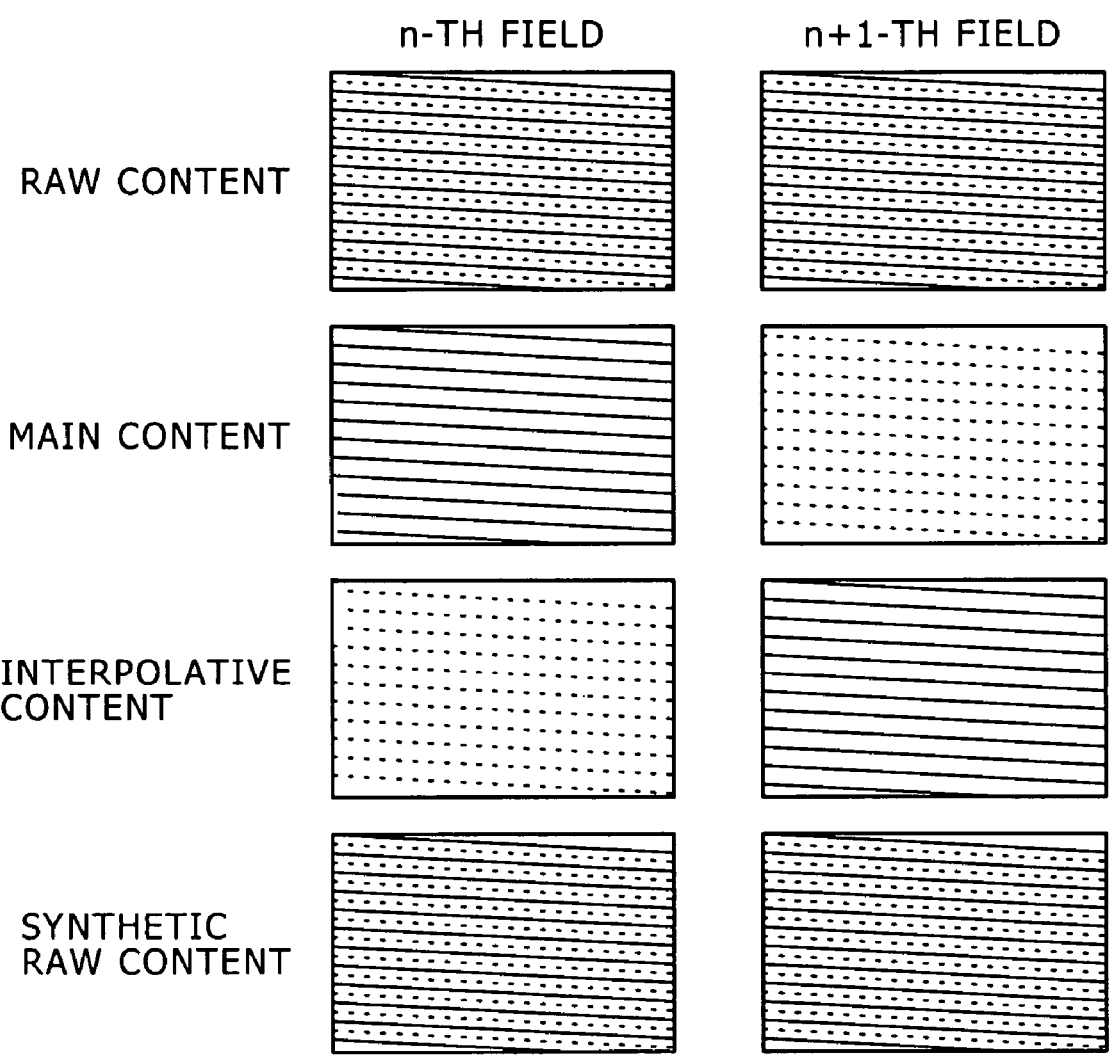
FIG. 3 is an explanatory diagram showing examples of a main content and an interpolative content.

FIG. 3 is an explanatory diagram showing examples of a main content and an interpolative content. For example, a raw content based on which the main content and interpolative content are produced is a picture which is formed according to the progressive scanning method so that the number of effective pixels in the picture will equal a product of 720 by 480.

A main content is produced based on the raw content so that it will include the odd-numbered lines contained in the n-th field (n-th frame) of the raw content and the even-numbered lines contained in the n+1-th field (n+1-th frame) thereof. The main content is a picture which is formed according to the interlaced scanning so that the number of effective pixels in the picture will equal a product of 720 by 480.

An interpolative content is produced based on the raw content so that it will include the even-numbered lines contained in the n-th field (n-th frame) of the raw content and the odd-numbered lined contained in the n+1-th field (n+1-th frame) thereof. The interpolative content is a picture which is formed according to the interlaced scanning so that the number of effective pixels in the picture will equal a product of 720 by 480.

In other words, when a main content serves as a top field included in a field, an interpolative content acts as a bottom field included therein. When the main content serves as a bottom field included in a field, the interpolative content acts as a top field included therein.

A main content and an interpolative content are synthesized in order to produce a raw content that is a picture which is conformable to the progressive scanning and in which the number of effective pixels equals a product of 720 by 480. Specifically, the associated lines constituting the interpolative content are arranged alternately with the adjacent lines constituting the main content, whereby the main content and interpolative content are synthesized.

Specifically, a main content and an interpolative content are synthesized so that: the lines constituting the interpolative content which serves as a bottom field in the n-th field will be arranged to underlie the respective lines constituting the main content which serves as a top field in the n-th field; and the lines constituting the interpolative content which serves as the top field in the n+1-th field will be arranged to overlie the respective lines constituting the main content which serves as the bottom field in the n+1-th field.

To be more specific, a main content and an interpolative content are synthesized so that: the second, fourth, sixth, and eighth lines, etc. contained in the interpolative content that serves as a bottom field will alternate with the first, third, fifth, and seventh lines, etc. contained in the main content that serves as a top field; the first line contained in the interpolative line that serves as the top field will overlie the second line contained in the main content that serves as the bottom field; and the third, fifth, seventh, and ninth lines, etc. contained in the interpolative content that serves as the top field will alternate with the second, fourth, sixth, and eighth lines, etc. contained in the main content that serves as the bottom field.

A main content formed according to the interlaced scanning so that the number of effective pixels therein will equal a product of 720 by 480 is synthesized with an interpolative content formed according to the interlaced scanning so that the number of effective pixels therein will equal a product of 720 by 480, whereby a raw content which is conformable to the progressive scanning and in which the number of effective pixels equals a product of 720 by 480 is produced.

Figure 4:
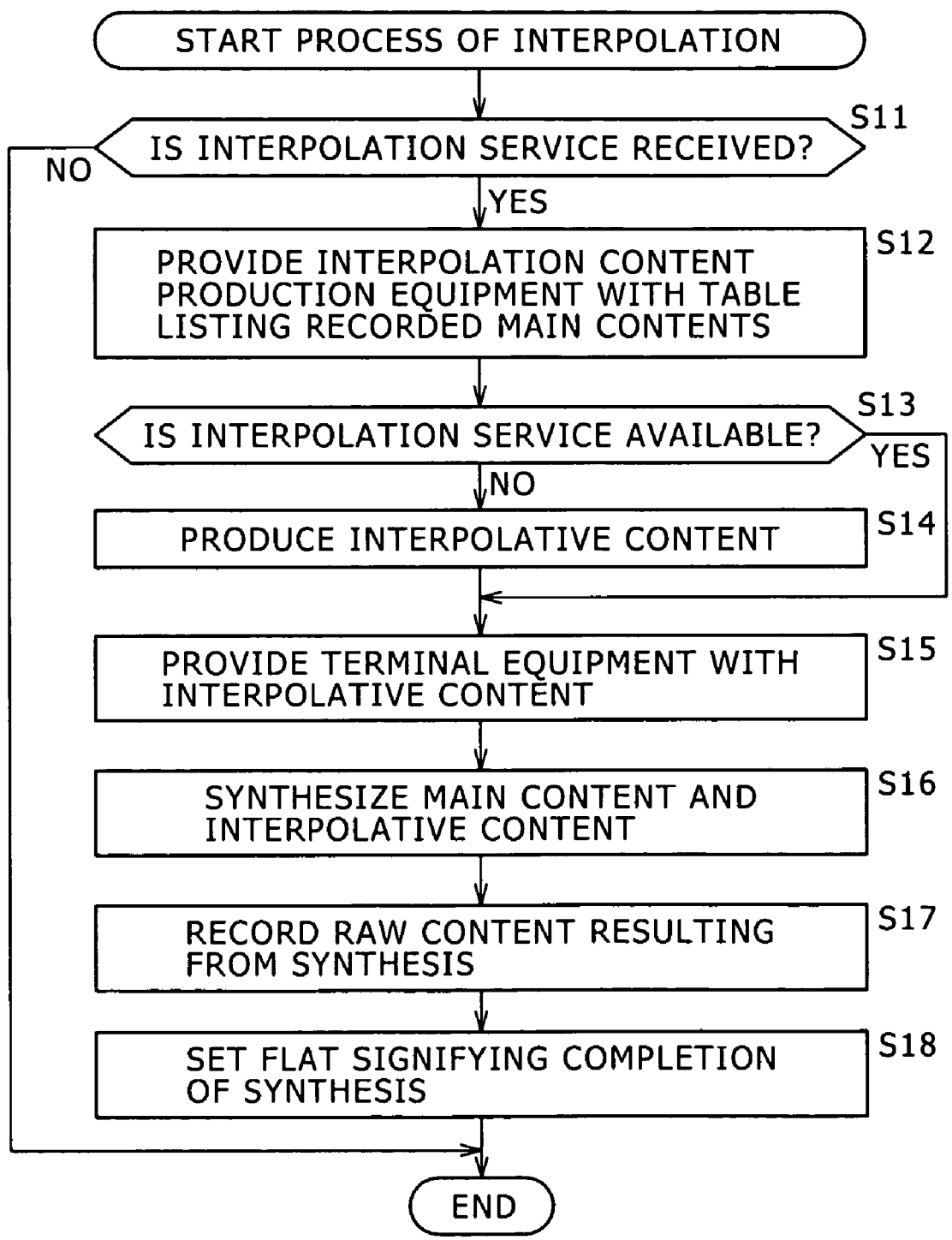
FIG. 4 is a flowchart describing a process of interpolation.

FIG. 4 is a flowchart describing a process of interpolation employed in the content provision system. At step S11, the terminal equipment 13 decides based on operator's manipulations or settings designated in advance whether it should receive an interpolation service. If a decision is made that the interpolation service is received, the process proceeds to step S12. The terminal equipment 13 provides (transmits) the interpolative content production equipment 12 with, for example, a table which lists recorded main contents, over the network 16.

For example, at step S12, the terminal equipment 13 provides (transmits) the interpolative content production equipment 12 with a table, which lists a name of a main content and a date and time of broadcast in association with each of recorded main contents, over the network 16. Moreover, for example, at step S12, the terminal equipment 13 may provide the interpolative content production equipment 12 with a table, which lists content IDs with which recorded main contents are identified, over the network 16. Furthermore, for example, at step S12, the terminal equipment 13 may provide the interpolative content production equipment 12 with data representing the beginning of a recorded main content that is a picture which lasts for a predetermined time (for example, 5 sec).

The interpolative content production equipment 12 acquires the table that lists recorded main contents and that is provided by the terminal equipment 13.

At step S13, the interpolative content production equipment 12 decides whether an interpolative content associated with a main content specified in the table provided by the terminal equipment 13 is available.

At step S13, if a decision is made that the interpolative content is unavailable, the process proceeds to step S14. The interpolative content production equipment 12 produces the interpolative content associated with the main content. The process proceeds to step S15. A process of interpolative content production will be described later with reference to the flowchart of FIG. 9.

At step S13, if a decision is made that the interpolative content is available, step S14 is skipped. The process proceeds to step S15.

At step S15, the interpolative content production equipment 12 provides the terminal equipment 13 with the interpolative content. Thus, the terminal equipment 13 acquires both the main content and interpolative content.

At step S16, the terminal equipment 13 synthesizes the main content and interpolative content, and transmits a raw content resulting from the synthesis. At step S17, the terminal equipment 13 records the raw content which results from the synthesis. Incidentally, the terminal equipment 13 may record the resultant raw content internally or in an external device.

At step S18, the terminal equipment 13 sets a flag, which signifies completion of synthesis, in relation to the main content and interpolative content alike. The process is then terminated.

If a decision is made at step S11 that the interpolation service is not received, steps S12 to S18 are not executed but the process is terminated.

As mentioned above, the interpolative content production equipment 12 that provides an interpolative content may recognize a main content acquired by the terminal equipment 13, and provide the terminal equipment 13 with an interpolative content associated with the main content.

A provider who provides an interpolative content gets aware of a main content acquired by the terminal equipment 13.

As mentioned above, the terminal equipment 13 synthesizes a main content and an interpolative content. Thus, a content of higher quality can be produced.

Next, the content production equipment 11, interpolative content production equipment 12, and terminal equipment 13 will be detailed below.

Figure 5:
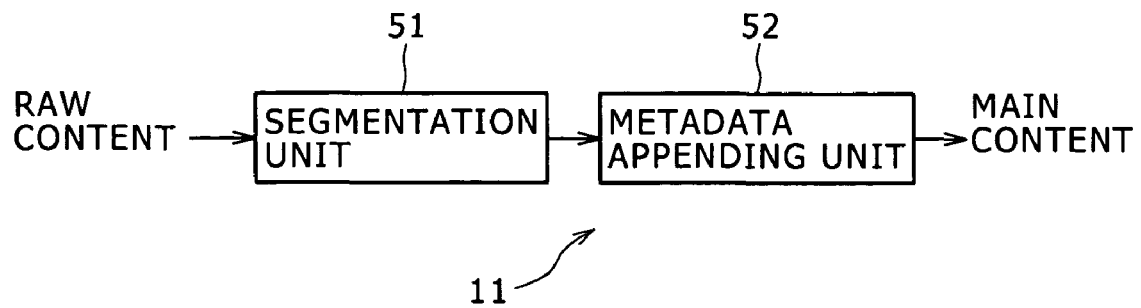
FIG. 5 is a block diagram showing an example of the configuration of a content production unit.

FIG. 5 is a block diagram showing the configuration of the content production equipment 11. The content production equipment 11 includes a segmentation unit 51 and a metadata appending unit.

The segmentation unit 51 segments a raw content in a spatial or temporal direction so as to produce a main content. Otherwise, the segmentation unit 51 quantizes the raw content into predetermined gray levels, which are used as reference levels, so as to produce the main content.

The segmentation unit 51 provides a metadata appending unit 52 with a main content.

The metadata appending unit 52 appends any of various kinds of metadata to the main content, and transmits the resultant main content having the metadata appended thereto. For example, the metadata appending unit 52 appends metadata, which includes a content ID with which a content is identified and type data specifying a main content, to the main content.

The metadata appending unit 52 may append metadata, which includes a number specifying each field (or each frame), to each field (or each frame) of the main content.

Figure 6:
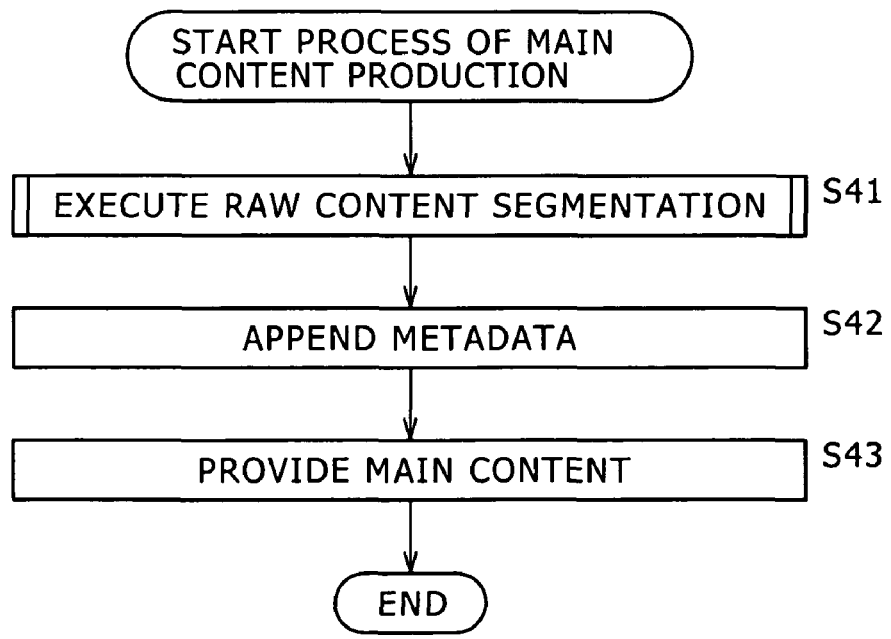
FIG. 6 is a flowchart describing a process of main content production.

FIG. 6 is a flowchart describing a process of main content production to be executed by the content production equipment 11. At step S41, the segmentation unit 51 executes raw content segmentation. The process of raw content segmentation will be detailed later.

At step S42, the metadata appending unit 52 appends metadata, which includes a content ID and type data or a number specifying each field (or each frame), to a main content produced by segmenting the raw content.

At step S43, the metadata appending unit 52 allows the content delivery unit 21 to provide the terminal equipment 13 with the main content having the metadata appended thereto. The process is then terminated.

Figure 7:
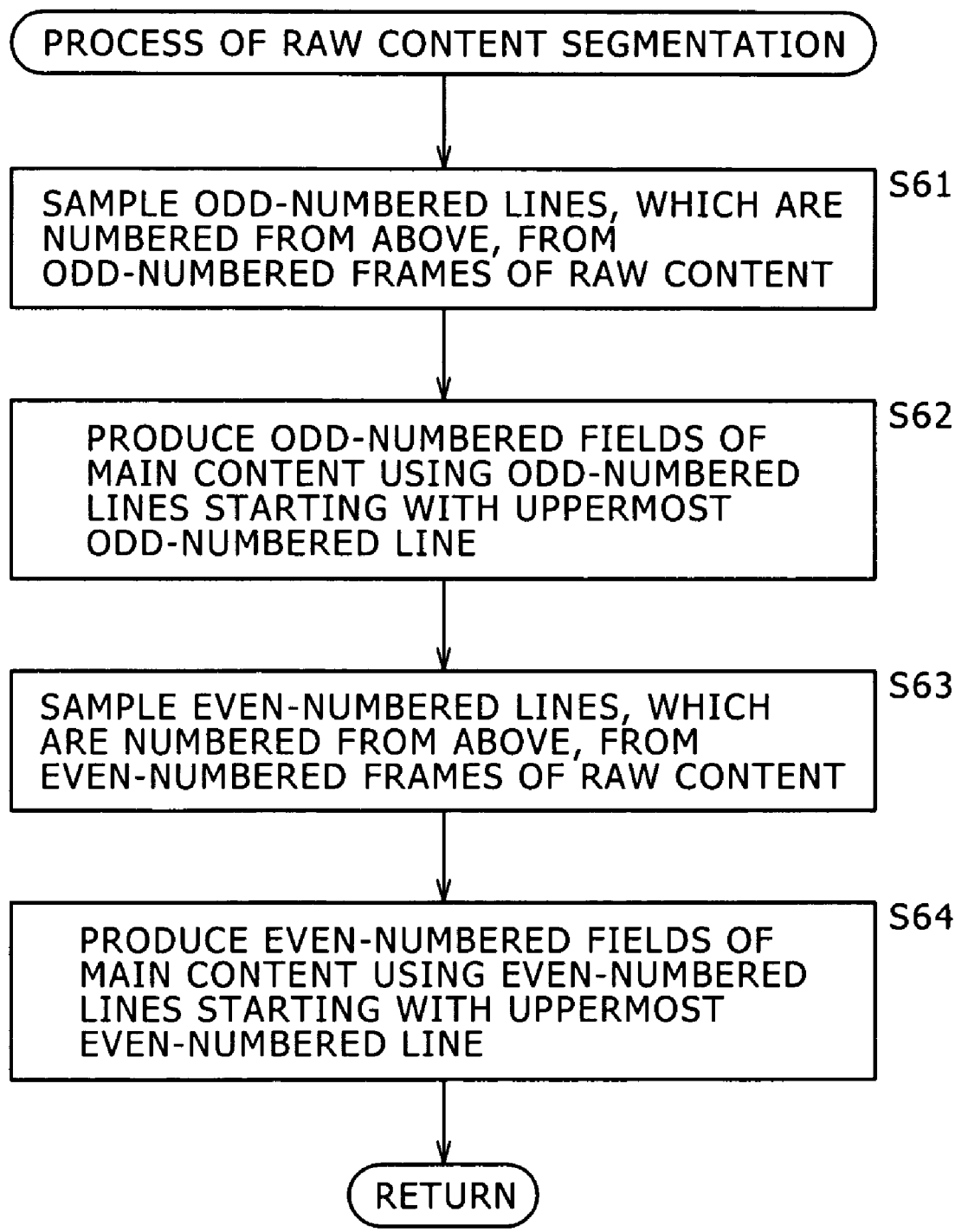
FIG. 7 is a flowchart describing an example of the details of a process of raw content segmentation.

FIG. 7 is a flowchart describing an example of the details of the process of raw content segmentation which is executed at step S41. At step S61, the segmentation unit 51 samples the odd-numbered lines, which are numbered from above, from the odd-numbered frames of the raw content that is a picture formed according to the progressive scanning method. At step S62, the segmentation unit 51 produces the odd-numbered fields of a main content using the odd-numbered lines sampled at step S61.

At step S63, the segmentation unit 51 samples the even-numbered lines, which are numbered from above, from the even-numbered frames of the raw content that is a picture formed according to the progressive scanning. At step S64, the segmentation unit 51 produces the even-numbered fields of the main content using the even-numbered lines sampled at step S63. The process is then terminated.

As mentioned above, the segmentation unit 51 samples every other line from a raw content formed according to the progressive scanning so as to produce a main content conformable to the interlaced scanning.

Figure 8:
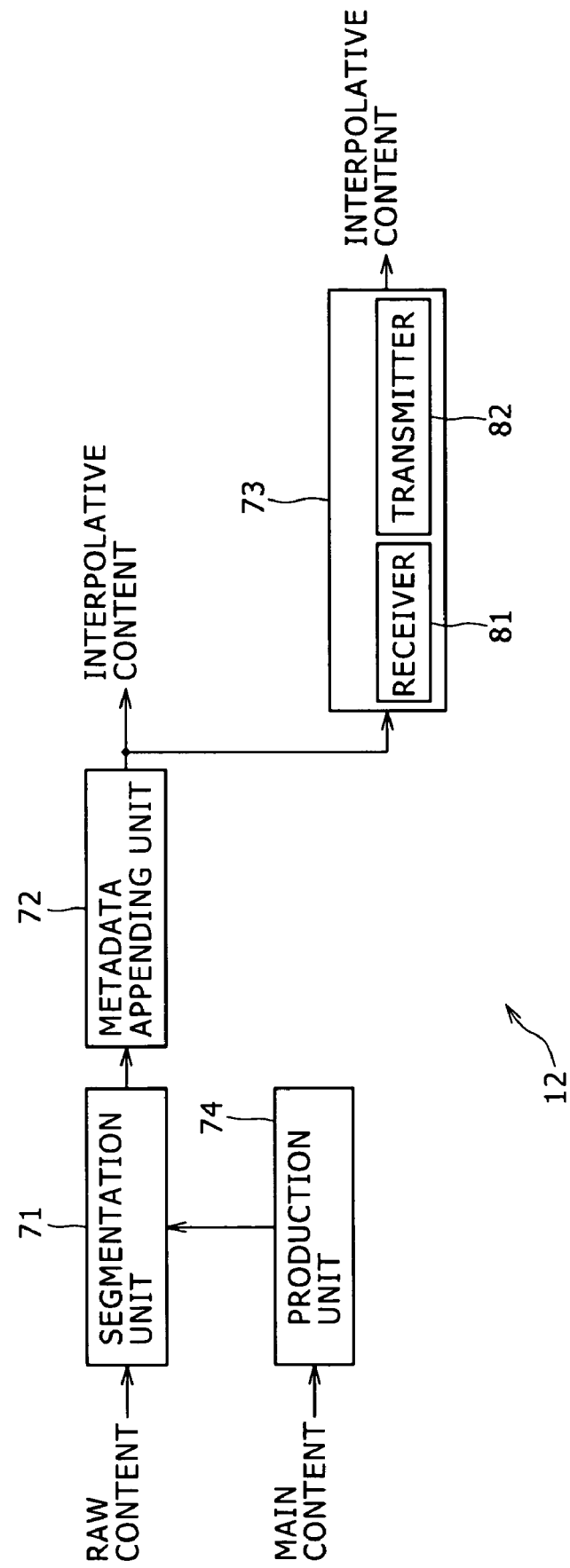
FIG. 8 is a block diagram showing an example of the configuration of interpolative content production equipment.

FIG. 8 is a block diagram showing the configuration of the interpolative content production equipment 12. The interpolative content production equipment 12 includes a segmentation unit 71, a metadata appending unit 72, a network interface 73, and a production unit 74.

The segmentation unit 71 acquires a raw content from the content production equipment 11 or acquires a raw content from the production unit 74. The segmentation unit 71 segments the raw content in a spatial or temporal direction so as to produce an interpolative content. Otherwise, the segmentation unit 71 quantizes the raw content into reference gray levels which are different from the reference gray levels used by the segmentation unit 51.

The segmentation unit 71 feeds the interpolative content to the metadata appending unit 72.

The metadata appending unit 72 appends any of various kinds of metadata to the interpolative content, and transmits the resultant interpolative content which has the metadata appended thereto or feeds the interpolative content to the network interface 73. For example, the metadata appending unit 72 appends metadata, which includes a content ID with which a content is identified and type data specifying an interpolative content, to the interpolative content. For example, the content ID of an interpolative content is identical to the content ID of a main content which is associated with the interpolative content and whose contents are identical to those of the interpolative content.

Incidentally, the metadata appending unit 72 may append metadata, which includes a number specifying each field (or each frame), to each field (or each frame) of the interpolative content.

The network interface 73 transmits the interpolative content to the terminal equipment 13 over the network 16. The network interface 73 includes a receiver 81 and a transmitter 82. The receiver 81 included in the network interface 73 receives a request for an interpolative content that is transmitted from the terminal equipment 13 over the network 16. The transmitter 82 included in the network interface 73 transmits the interpolative content to the terminal equipment 13 over the network 16 in response to the request, and thus provides the terminal equipment 13 with the interpolative content.

The production unit 74 applies signal processing to the main content provided by the content production equipment 11 so as to produce a raw content, and feeds the produced raw content to the segmentation unit 71.

Figure 9:
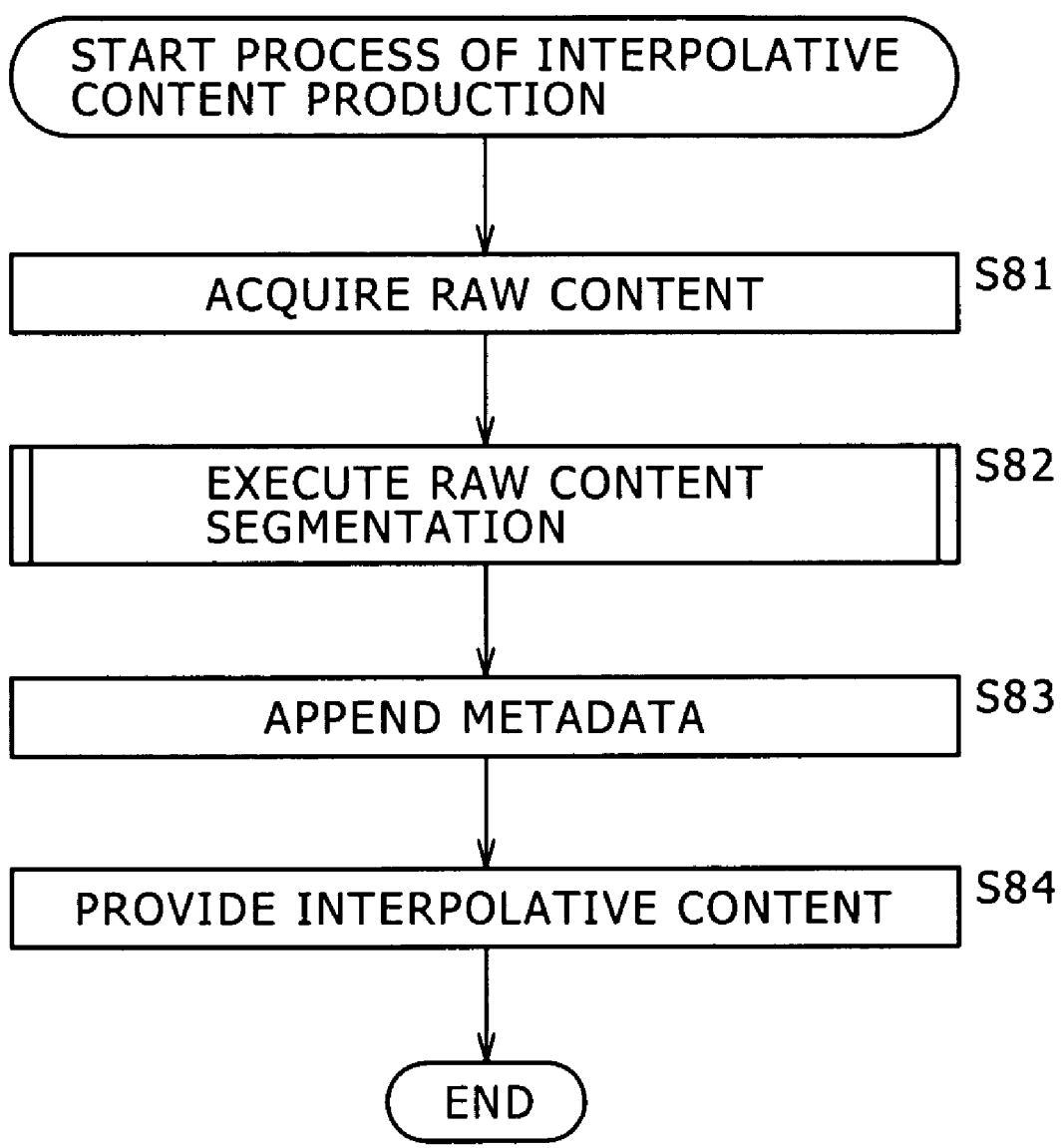
FIG. 9 is a flowchart describing a process of interpolative content production.

FIG. 9 is a flowchart describing a process of interpolative content production to be executed by the interpolative content production equipment 12. At step S81, the segmentation unit 71 acquires a raw content from the content production equipment 11. For example, at step S81, the segmentation unit 71 acquires a raw content by receiving the raw content that is transmitted from the content production equipment 11 over a communication line. Otherwise, for example, at step S81, the segmentation unit 71 acquires a raw content by reading the raw content from a recording medium in which the raw content provided by the content production equipment 11 is recorded.

At step S82, the segmentation unit 51 executes raw content segmentation. The process of raw content segmentation will be detailed later.

At step S83, the metadata appending unit 72 appends metadata, which includes a content ID and type data or a number specifying each field (or each frame), to an interpolative content produced by executing raw content segmentation.

At step S84, the metadata appending unit 72 allows the content delivery unit 22 to provide the terminal equipment 13 with the interpolative content having the metadata appended thereto. The process is then terminated.

Figure 10:
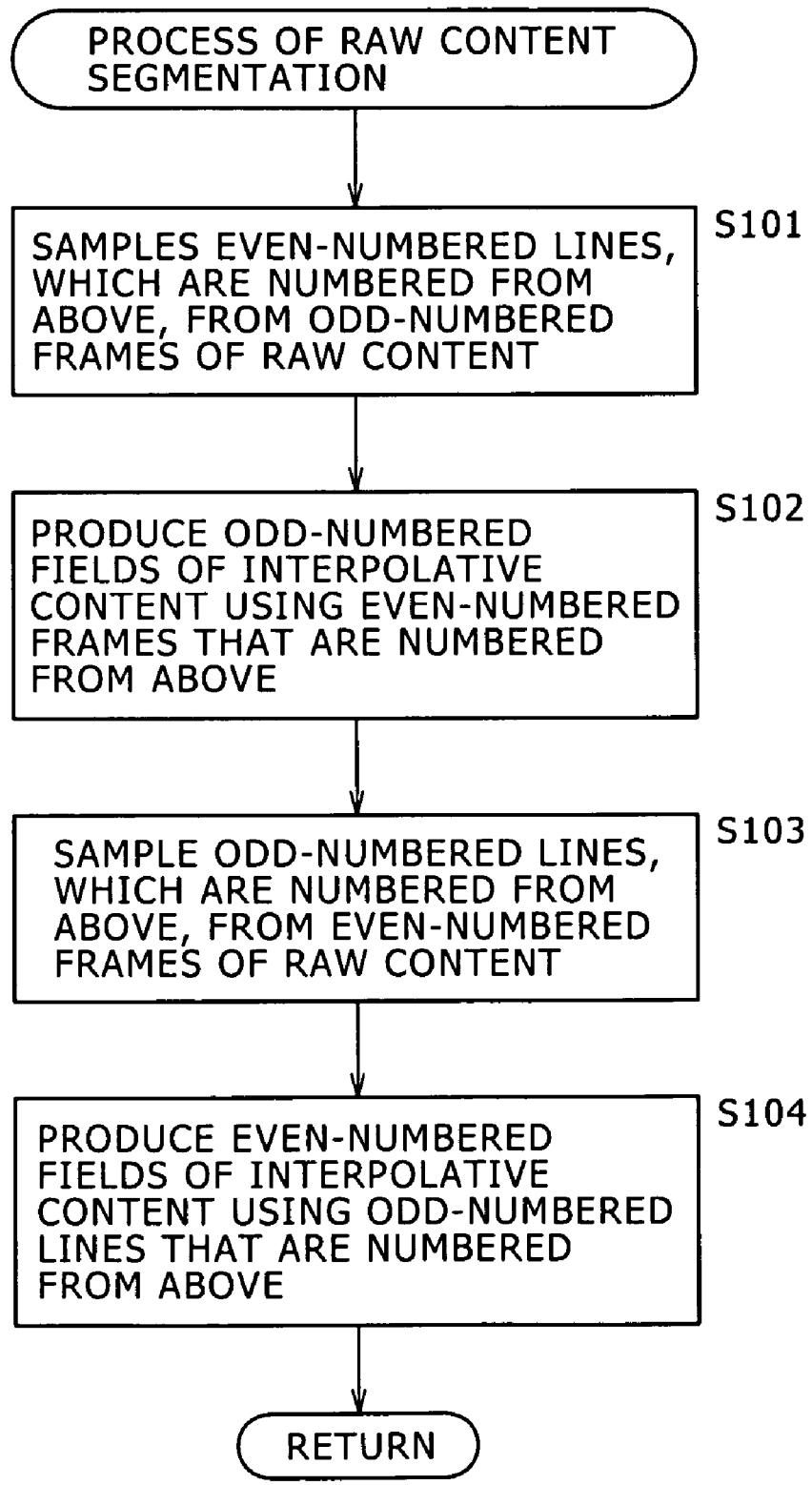
FIG. 10 is a flowchart describing an example of the details of a process of raw content segmentation.

FIG. 10 is a flowchart describing an example of the details of the process of raw content segmentation to be executed at step S82. At step S101, the segmentation unit 71 samples the even-numbered lines, which are numbered from above, from the odd-numbered frames of a raw content that is a picture formed according to the progressive scanning. At step S102, the segmentation unit 71 produces the odd-numbered fields of an interpolative content using the even-numbered lines sampled at step S101.

At step S103, the segmentation unit 71 samples the odd-numbered lines, which are numbered from above, from the even-numbered frames of the raw content that is a picture formed according to the progressive scanning. At step S104, the segmentation unit 71 produces the even-numbered fields of the interpolative content using the odd-numbered lines sampled at step S103. The process is then terminated.

As mentioned above, the segmentation unit 71 samples every other line from a raw content, which has lines thereof arranged according to the progressive scanning, so as to produce an interpolative content conformable to the interlaced scanning. At this time, the sampled lines are different from those sampled in order to produce a main content.

Figure 11:
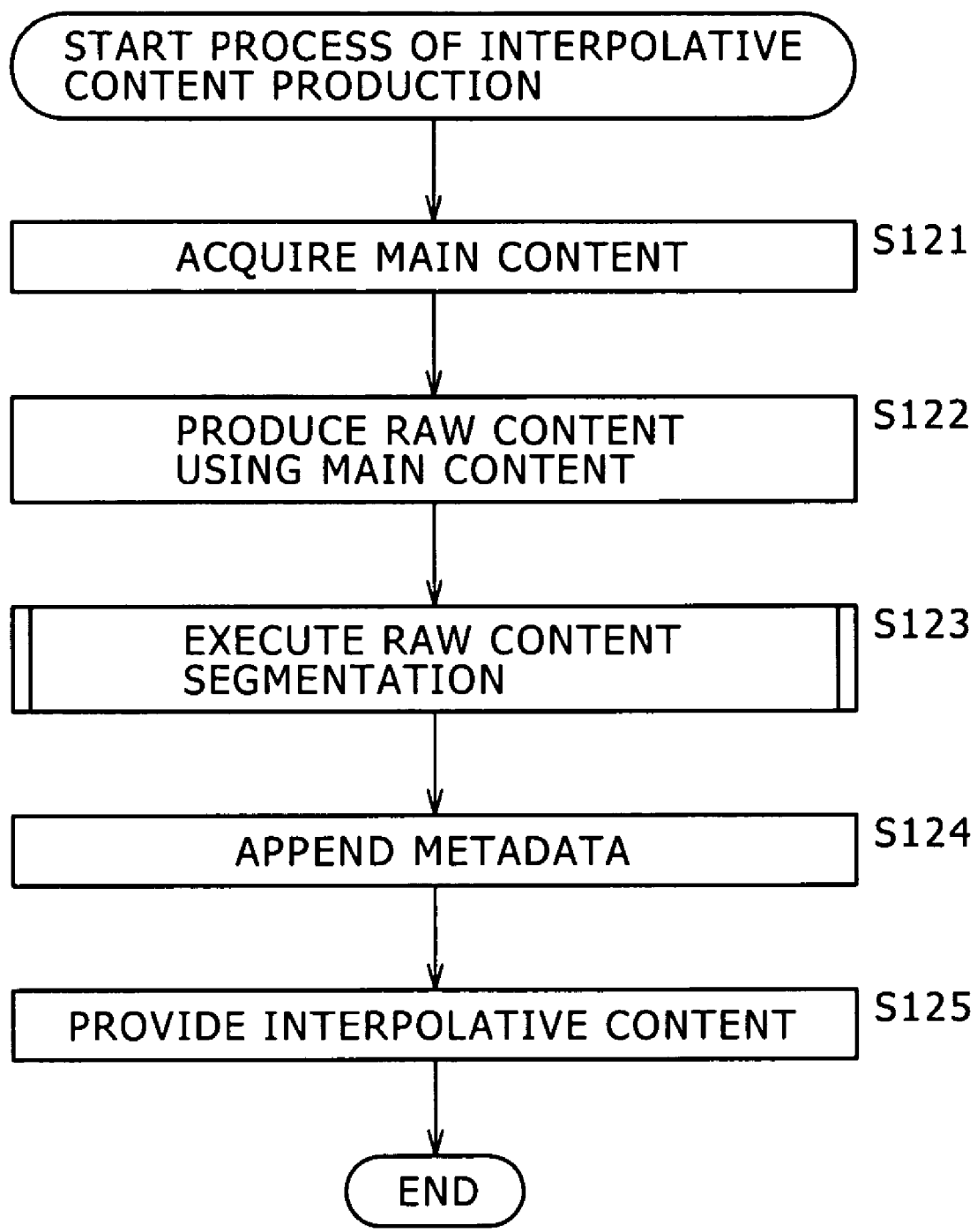
FIG. 11 is a flowchart describing another process of interpolative content production.

FIG. 11 is a flowchart describing another process of interpolative content production to be executed by the interpolative content production equipment 12. At step S121, the production unit 74 acquires a main content from the content production equipment 11. At step S122, the production unit 74 produces a raw content using the main content.

For example, at step S122, the production unit 74 produces a raw content by applying predetermined signal processing to the main content. For example, at step S122, the production unit 74 applies signal processing such as digital reality creation (DRC)® (classification adaptation) to the main content so as to produce the raw content.

Steps S123 to S125 are identical to steps S82 to S84 mentioned in FIG. 9. An iterative description will be omitted.

Figure 12:
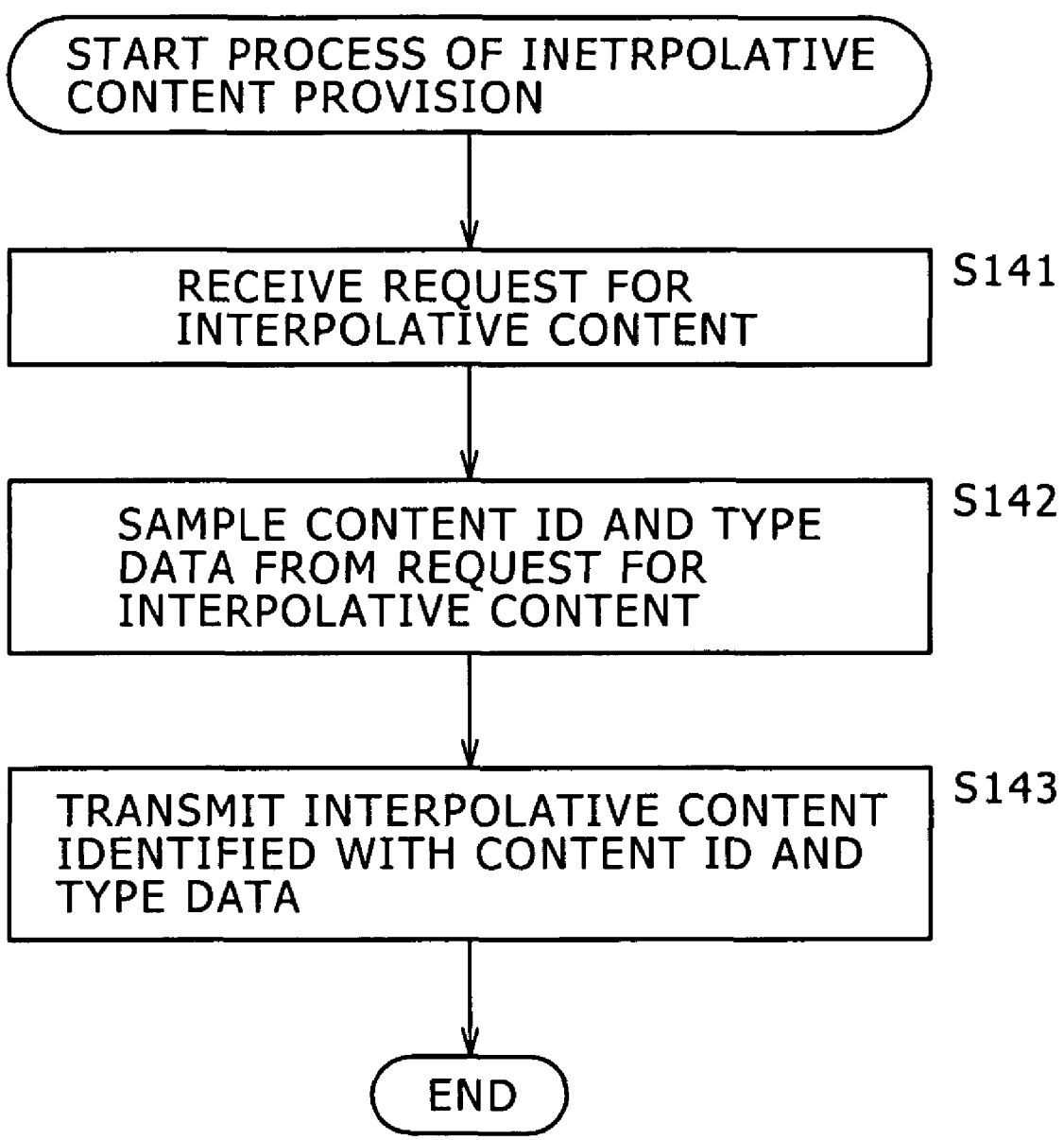
FIG. 12 is a flowchart describing a process of interpolative content provision.

FIG. 12 is a flowchart describing a process of interpolative content provision. At step S141, the receiver 81 included in the network interface 73 receives a request for an interpolative content which is transmitted from the terminal equipment 13 over the network 16. At step S142, the interpolative content production equipment 12 samples a content ID and type data from the received request for an interpolative content.

At step S143, the transmitter 82 included in the network interface 73 transmits an interpolative content, which is identified with the content ID and type data sampled at step S142, to the terminal equipment 13 over the network 16. The process is then terminated.

For example, assuming that a content ID "AAA" and type data specifying an interpolative content are sampled at step S142, the transmitter 82 transmits an interpolative content, which is a content identified with the content ID "AAA," to the terminal equipment 13 over the network 16.

For example, assuming that a content ID "AAA" and type data specifying a main content are sampled at step S142, the transmitter 82 may transmit an interpolative content, which is a content identified with the content ID "AAA," to the terminal equipment 13 over the network 16 at step S143.

At step S141, the receiver 81 receives the leading portion of the main content sent from the terminal equipment 13 over the network 16 which has a predetermined length (for example, a portion lasting for five sec). The interpolative content production equipment 12 may identify the main content on the basis of the leading portion having the predetermined length, and transmit an interpolative content, which is associated with the identified main content, to the terminal equipment 13 over the network 16.

As mentioned above, the interpolative content production equipment 12 provides the terminal equipment 13 with an interpolative content.

Figure 13:
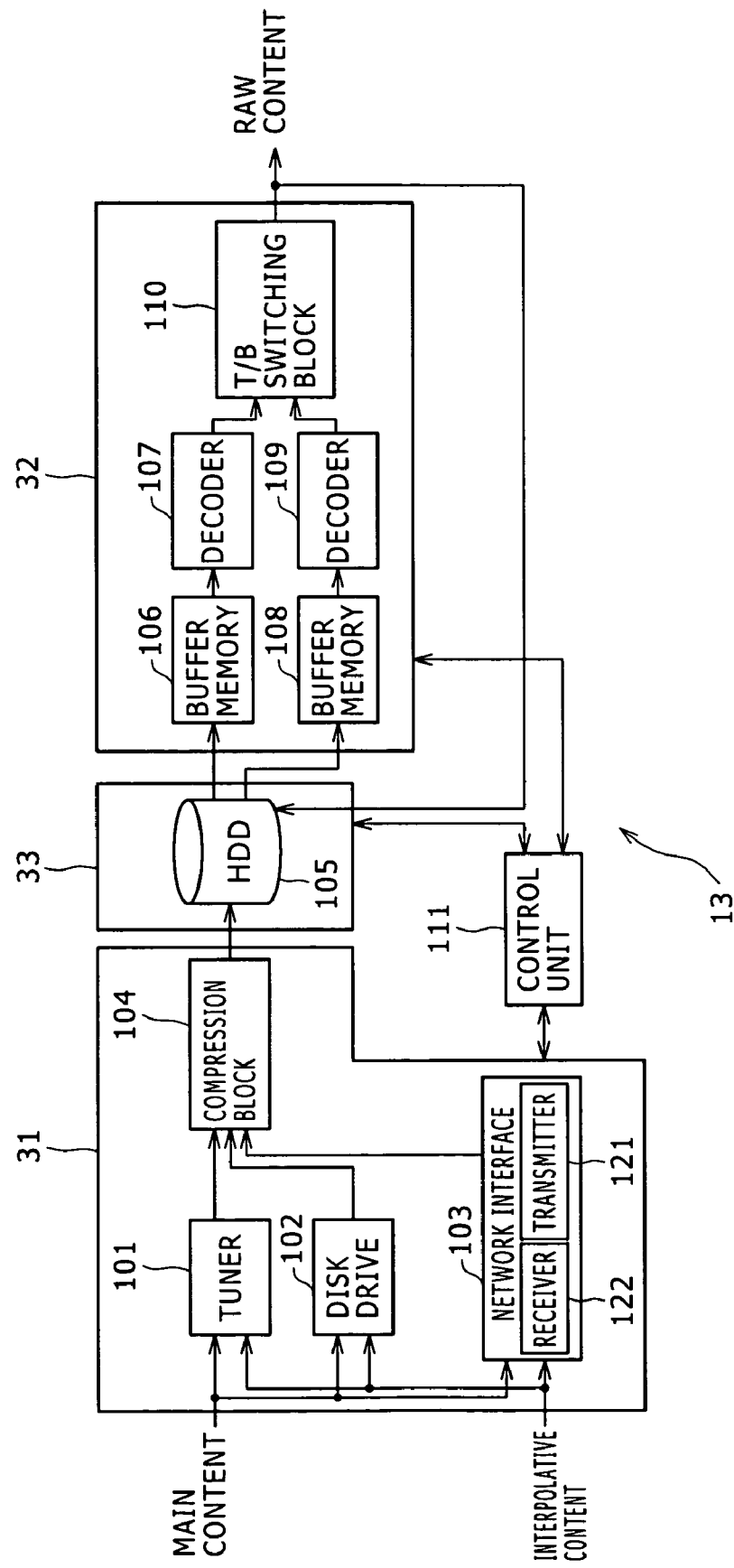
FIG. 13 is a block diagram showing an example of the detailed configuration of terminal equipment.

FIG. 13 is a block diagram showing an example of the detailed configuration of the terminal equipment 13. The terminal equipment 13 includes a tuner 101, a disk drive 102, a network interface 103, a compression block 104, a hard disk drive (HDD) 105, a buffer memory 106, a decoder 107, a buffer memory 108, a decoder 109, a T/B switching block 110, and a control unit 111.

The tuner 101, disk drive 102, network interface 103, and compression block 104 constitute the acquisition unit 31. The HDD 105 corresponds to the recording unit 33. The buffer memory 106, decoder 107, buffer memory 108, decoder 109, and T/B switching block 110 constitute the synthesis unit 32.

The tuner 101 receives a broadcasted main content or interpolative content, and feeds the received main content or interpolative content to the compression block 104. Assuming that the recording medium 17-1 that is a disk in which the main content is recorded is loaded, the disk drive 102 reads the main content from the recording medium 17-1, and feeds the read main content to the compression block 104. Moreover, assuming that the recording medium 17-2 that is a disk in which an interpolative content is recorded is loaded, the disk drive 102 reads the interpolative content from the recording medium 17-2 and feeds the read interpolative content to the compression block 104.

The network interface 103 receives the main content or interpolative content transmitted over the network 16.

The network interface 103 includes a transmitter 121 and a receiver 122. The transmitter 121 transmits a request for an interpolative content to the interpolative content production equipment 12 over the network 16 under the control of the control unit 111. The receiver 122 receives the interpolative content that is transmitted from the interpolative content production equipment 12 over the network 16.

Moreover, the transmitter 121 transmits a request for a main content to the content production equipment 11 over the network 16 under the control of the control unit 111. The receiver 122 receives the main content that is transmitted from the content production equipment 11 over the network 16.

The network interface 103 feeds the received main content or interpolative content to the compression block 104.

The compression block 104 compresses a main content or an interpolative content, which is fed from the tuner 101, disk drive 102, or network interface 103, according to a predetermined standard such as the Moving Picture Expert Group (MPEG) standards or the ISO/IEC 14496-10 MPEG-4 Part 10 Advanced Video Coding/ITU-T Rec. H.264 (AVC/H.264) standard. The compression block 104 feeds the compressed main content or interpolative content to the HDD 105.

The HDD 105 records the compressed main content or interpolative content, which is fed from the compression block 104, under the control of the control unit 11. The HDD 105 reads the recorded main content under the control of the control unit 11, and feeds the main content to the buffer memory 106. Moreover, the HDD 105 reads the recorded interpolative content under the control of the control unit 11, and feeds the read interpolative content to the buffer memory 108.

The buffer memory 106 temporarily holds the compressed main content fed from the HDD 105, and feeds the temporarily held main content to the decoder 107. The decoder 107 decodes the compressed main content, and feeds the decoded main content to the T/B switching block 110.

Moreover, the buffer memory 108 temporarily holds the compressed interpolative content fed from the HDD 105, and feeds the temporarily held interpolative content to the decoder 109. The decoder 109 decodes the compressed interpolative content, and feeds the decoded interpolative content to the T/B switching block 110.

The T/B switching block 110 switches the lines constituting the main content and the lines constituting the interpolative content so as to synthesize the main content and interpolative content. The T/B switching block 110 transmits a raw content produced by synthesizing the main content and interpolative content.

The control unit 111 controls the acquisition unit 31, synthesis unit 32, and recording unit 33. For example, the control unit 111 decides whether a main content or interpolative content is present. If a decision is made that the main content or interpolative content is present, the synthesis unit 32 is allowed to synthesize the main content and interpolative content. For example, the control unit 111 controls the network interface 103 so that a request for a main content or interpolative content will be transmitted responsively to user's manipulations.

Figure 14:
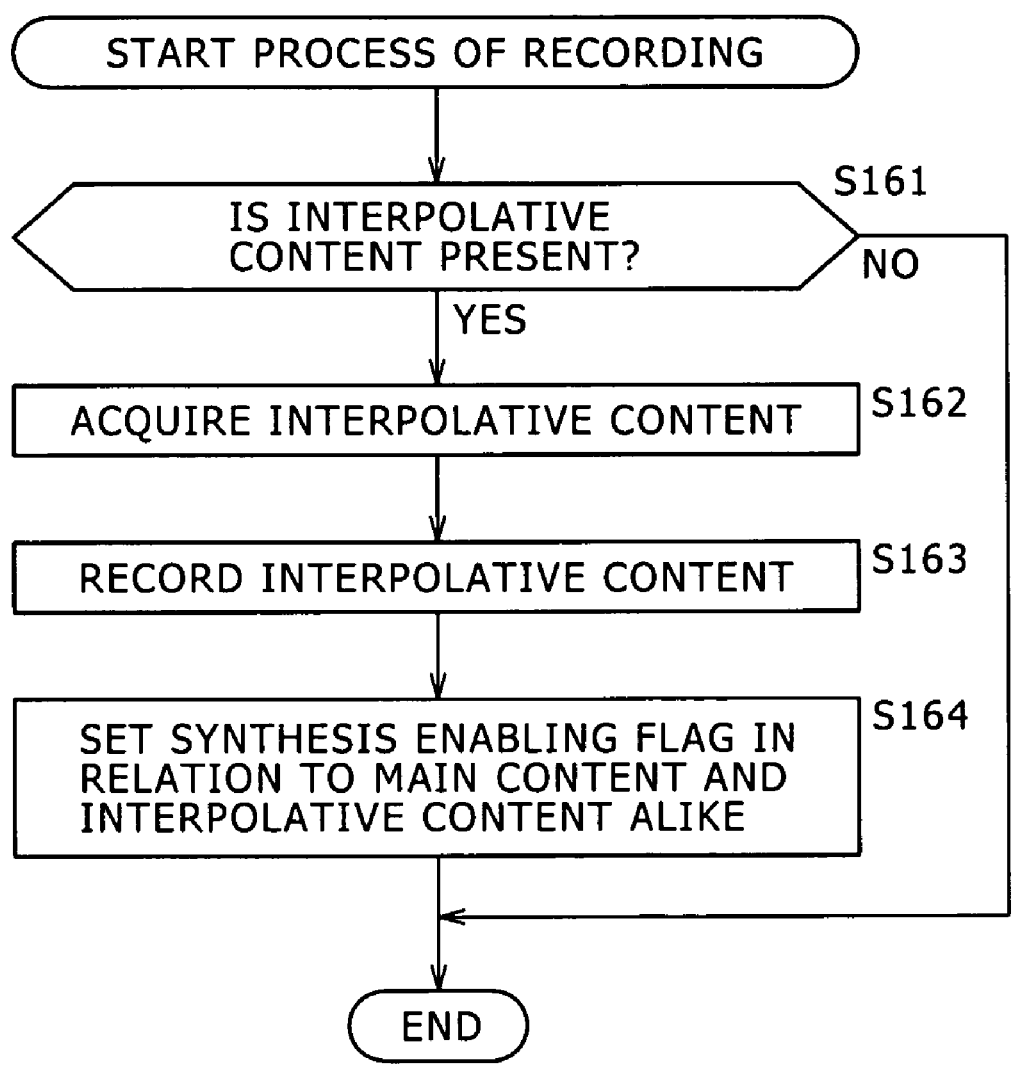
FIG. 14 is a flowchart describing a process of recording.

FIG. 14 is a flowchart describing a process of recording to be executed by the terminal equipment 13. At step S161, the acquisition unit 31 decides whether an interpolative content is present. If a decision is made that the interpolative content is present, the process proceeds to step S162. The acquisition unit 31 acquires the interpolative content. For example, if the tuner 101 receives an interpolative content, if the recording medium 17-2 in which an interpolative content is recorded is loaded into the disk drive 102, or if the network interface 103 receives an interpolative content sent over the network 16, the acquisition unit 31 decides at step S161 that the interpolative content is present.

For example, at step S162, the acquisition unit 31 allows the tuner 101 to receive an interpolative content and thus acquires the interpolative content. Moreover, for example, at step S162, the acquisition unit 31 may allow the disk drive 102 to read an interpolative content from the loaded recording medium 17-2 and thus may acquire the interpolative content. Furthermore, for example, at step S162, the acquisition unit 31 may allow the receiver 122 included in the network interface 103 to receive an interpolative content sent over the network 16, and thus may acquire the interpolative content.

At step S163, the recording unit 33 records the acquired interpolative content.

At step S164, the recording unit 33 sets a synthesis enabling flag, which signifies that a main content and an interpolative content can be synthesized, in relation to the main content and interpolative content alike. The process is then terminated.

On the other hand, if a decision is made at step S161 that an interpolative content is absent, steps S162 to S164 are skipped. The process is then terminated.

Figure 15:
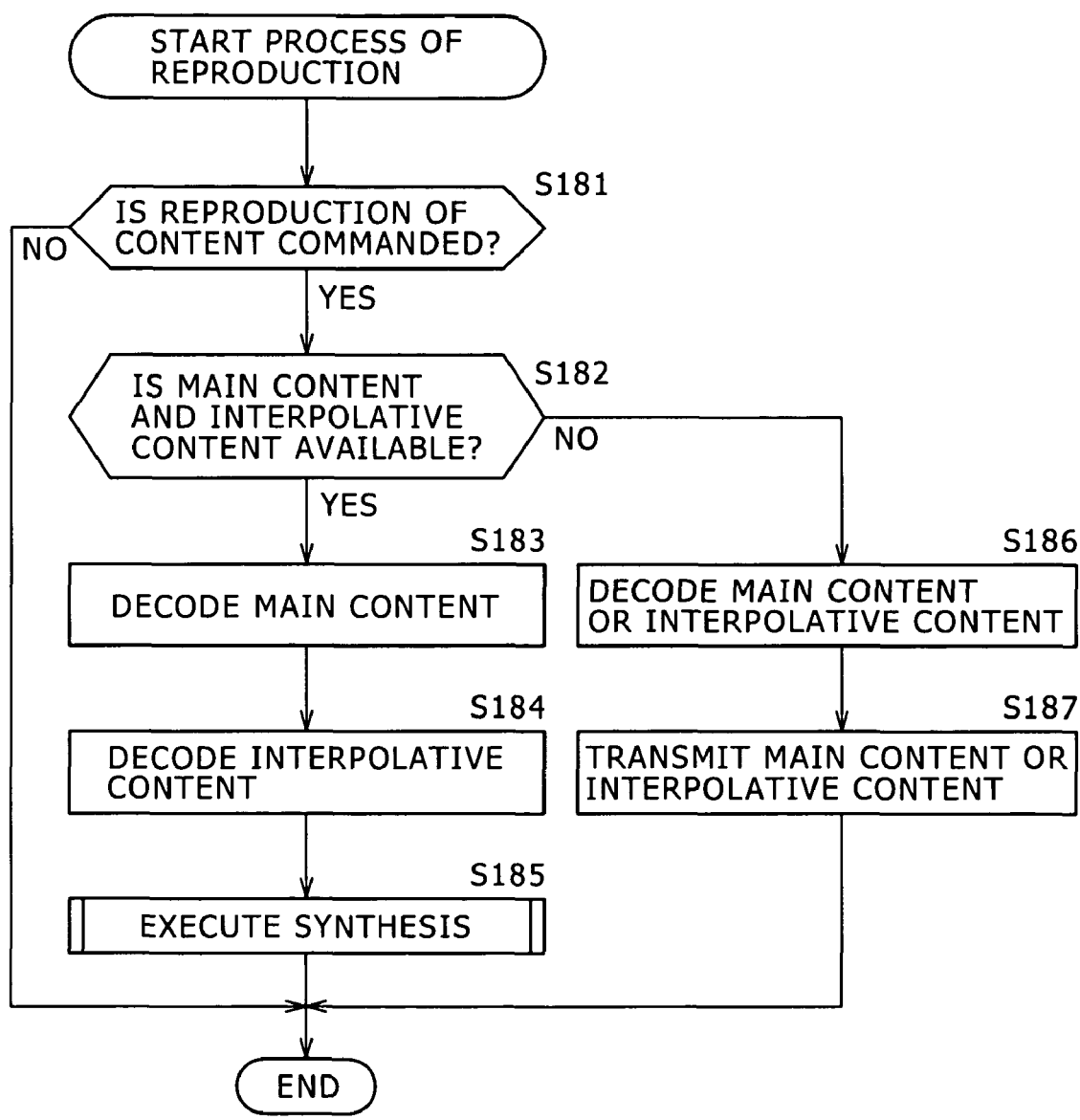
FIG. 15 is a flowchart describing a process of reproduction.

FIG. 15 is a flowchart describing a process of reproduction to be executed by the terminal equipment 13. At step S181, the control unit 111 decides whether reproduction of a content is commanded. If a decision is made that the reproduction of a content is commanded, the process proceeds to step S182. The control unit 111 then decides based on the synthesis enabling flag whether both a main content and an interpolative content are present.

A step S182, if a decision is made that both a main content and an interpolative content are present, the process proceeds to step S183. The decoder 107 decodes the main content. Specifically, at step S183, the main content is read from the HDD 105 and temporarily stored in the buffer memory 106. The decoder 107 sequentially reads the main content from the buffer memory 106, and decodes the read main content.

At step S184, the decoder 109 decodes an interpolative content associated with the main content decoded at step S183. Specifically, at step S184, the interpolative content associated with the main content is read from the HDD 105 and temporarily stored in the buffer memory 108. The decoder 109 sequentially reads the interpolative content from the buffer memory 108 and decodes the read interpolative content.

At step S185, the synthesis unit 32 executes synthesis. The process is then terminated. The process of synthesis will be detailed later.

On the other hand, if a decision is made that both a main content and an interpolative content are absent, that is, a main content is absent but an interpolative content is present or an interpolative content is present but a main content is absent, the process proceeds to step S186. The decoder 107 decodes the main content or the decoder 109 decodes the interpolative content. In other words, if a main content is absent but an interpolative content is present, the decoder 109 decodes the interpolative content at step S186. If a main content is present but an interpolative content is absent, the decoder 107 decodes the main content at step S186.

At step S187, the decoder 107 transmits the main content or the decoder 109 transmits the interpolative content. The process is then terminated.

As mentioned above, if both a main content and an interpolative content are present, the main content and interpolative content are synthesized in order to transmit a content of higher quality. If only one of a main content and an interpolative content is present, either of the main content or interpolative content is decoded and transmitted.

Figure 16:
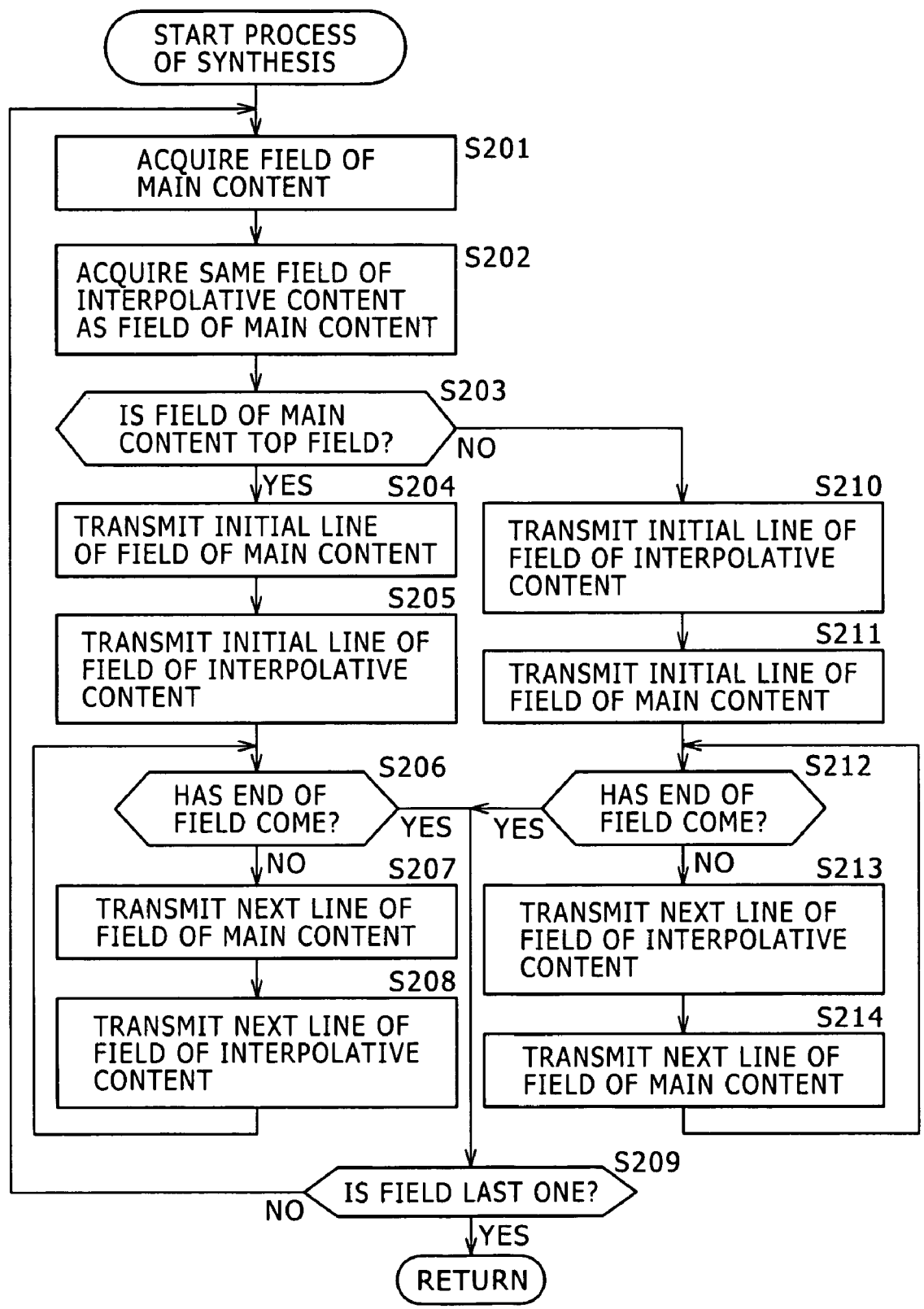
FIG. 16 is a flowchart describing the details of a process of synthesis.

FIG. 16 is a flowchart describing the details of the process of synthesis to be executed at step S185 in order to synthesize a main content, which is conformable to the interlaced scanning, and an interpolative content conformable to the interlaced scanning. At step S201, the T/B switching block 110 acquires a field of the main content from the decoder 107. At step S202, the T/B switching block 110 acquires the same field of the interpolative content as the field of the main content, which is acquired at step S201, from the decoder 109.

For example, at step S202, the T/B switching block 110 acquires the same field of the interpolative content as the field of the main content on the basis of metadata appended to the field. Moreover, for example, at step S202, the T/B switching block 110 acquires a field of the interpolative content, which is the same image as the image of a field of the main content, so as to thus acquire the same field of the interpolative content as the field of the main content.

At step S203, the T/B switching block 110 decides whether the field of the main content acquired at step S201 are a top field. If a decision is made that the field of the main content is a top field, the process proceeds to step S204. The T/B switching block 110 transmits an initial line of the field of the main content.

At step S206, the T/B switching block 110 transmits an initial line of the field of the interpolative content.

At step S206, the T/B switching block 110 decides whether the end of the field has come. If a decision is made that the end of the field has not come, the process proceeds to step S207. The T/B switching block 110 transmits the next line of the field of the main content. At step S208, the T/B switching block 110 transmits the next line of the field of the interpolative content. The process is then returned to step S206. Until the end of the field comes, the T/B switching block 110 alternately repeats transmission of a line of the field of the main content and transmission of a line of the field of the interpolative content.

At step S206, if a decision is made that the end of the field has come, the process proceeds to step S209. The T/B switching block 110 decides whether the field is the last field. If a decision is made that the field is not the last field, the process returns to step S201 and repeated.

If a decision is made at step S203 that the field of the main content is not a top field, it means that the field of the interpolative content is a top field. Consequently, the process proceeds to step S210. The T/B switching block 110 transmits the initial line of the field of the interpolative content.

At step S211, the T/B switching block 110 transmits the initial line of the field of the main content.

At step S212, the T/B switching block 110 decides whether the end of the field has come. If a decision is made that the end of the field has not come, the process proceeds to step S213. The next line of the field of the interpolative content is transmitted. At step S214, the T/B switching block 110 transmits the next line of the field of the main content. The process returns to step S212. Until the end of the field comes, the transmission of a line of the field of the interpolative content and the transmission of a line of the field of the main content are alternately repeated.

If a decision is made at step S212 that the end of the field has come, the process proceeds to step S209. The T/B switching block 110 decides whether the field is the last one. If a decision is made that the field is not the last one, the process returns to step S201. The aforesaid process is repeated.

If a decision is made at step S209 that the field is the last one, the process of synthesis is terminated.

As mentioned above, lines of an interpolative content associated with lines of a main content are arranged alternately with the adjacent lines of the main content, whereby the main content and interpolative content are synthesized. Consequently, a content of higher quality conformable to the progressive scanning is transmitted.

For example, assuming that a main content is first broadcasted and an interpolative content is rebroadcasted, when the main content and interpolative content are received, a content conformable to the progressive scanning is produced. In this case, the broadcasted main content alone may be received first and then reproduced. Even when the main content is not received, the rebroadcasted interpolative content alone may be received. Thus, the interpolative content having the same contents as the main content may be reproduced.

Compared with broadcasting of a content formed according to the progressive scanning, broadcasting of a main content or an interpolative content conformable to the interlaced scanning can be achieved using a narrower frequency band. Moreover, the main content may be broadcasted first and the interpolative content may be rebroadcasted, that is, the same content may be broadcasted twice. In this case, either of the main content and interpolative content can be received more frequently.

When a main content or an interpolative content is broadcasted or transmitted, a receiving side can obtain a content of higher quality without the necessity of largely occupying a broadcast band or a communication band.

For example, a main content may be broadcasted as a commercial message free of charge, and the recording medium 17-2 in which an interpolative content is recorded may be transferred at a charge. This would promote the sale of the recording medium 17-2.

The same applies to a case where a main content is broadcasted free of charge and an interpolative content is distributed at a charge over the network 16, a case where the main content is broadcasted free of charge and the interpolative content is broadcasted at a charge, or a case where the recording medium 17-1 in which the main content is recorded is rented for use or leased and the recording medium 17-2 in which the interpolative content is recorded is sold (transferred at a charge).

Furthermore, a main content and an interpolative content may be provided at a charge. For example, the recording medium 17-1 in which the main content is recorded may be sold and the recording medium 17-2 in which the interpolative content is recorded may be sold.

A main content is not limited to a picture conformable to the interlaced scanning. An interpolative content is not limited to a picture conformable to the interlaced scanning and made up of lines that alternate with adjacent lines constituting the main content which is a picture conformable to the interlaced scanning. The main content and interpolative content should merely be mutually interpolated in a spatial or temporal direction or have sets of gray levels, into which they are quantized, mutually interpolated.

Now, other forms of a main content and an interpolative content, a process of segmentation, and a process of synthesis will be described below.

To begin with, a description will be made of a main content and an interpolative content that have sets of gray levels, into which they are quantized, mutually interpolated.

Figure 17:
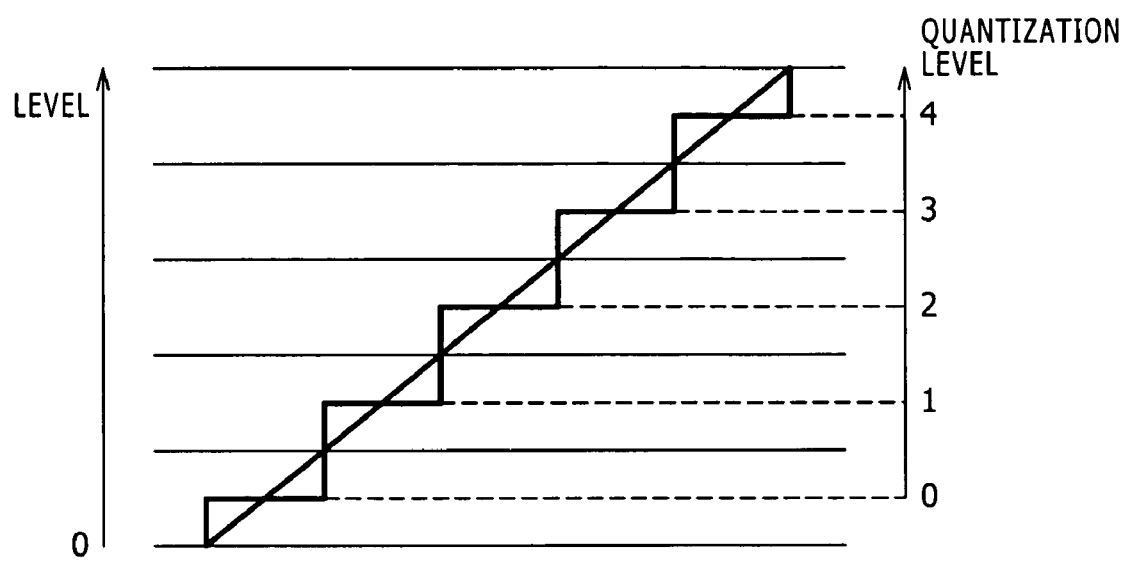
FIG. 17 is an explanatory diagram concerning quantization of a main content.
Figure 18:
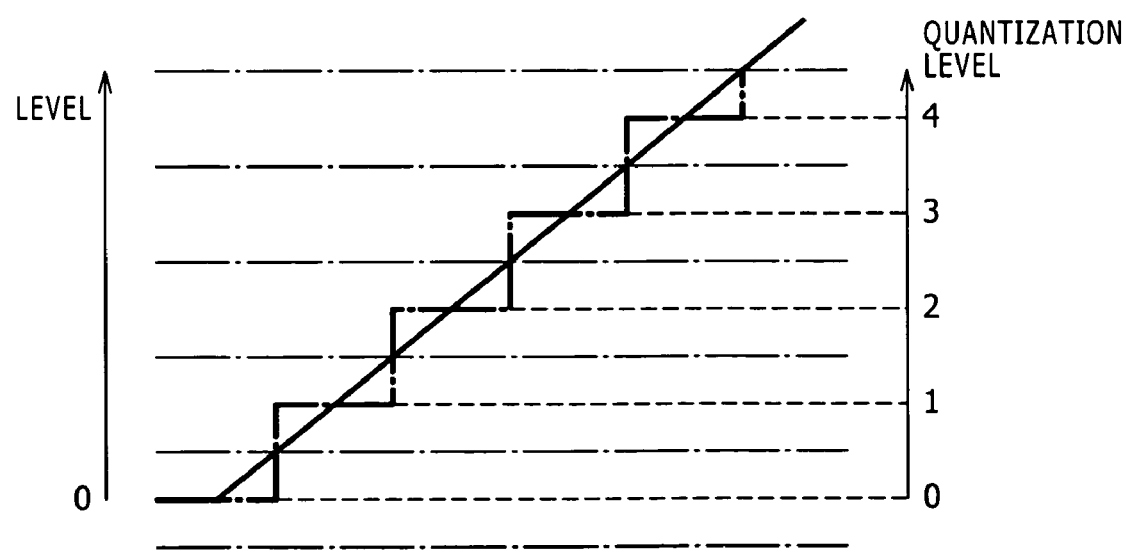
FIG. 18 is an explanatory diagram concerning quantization of an interpolative content.
Figure 19:
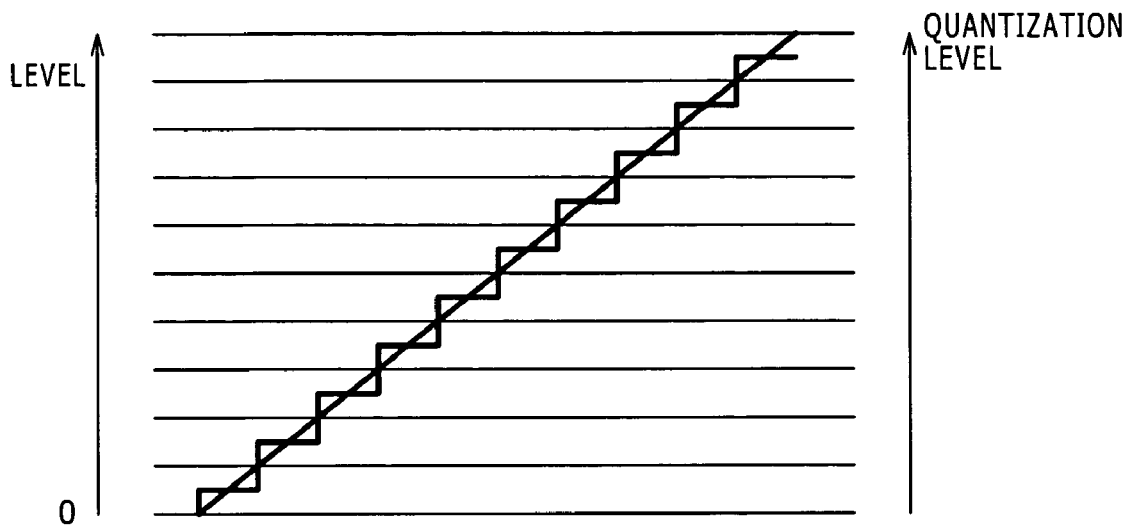
FIG. 19 is an explanatory diagram concerning contents to be synthesized.

FIG. 17 to FIG. 19 are explanatory diagrams concerning examples of quantization of a main content, an interpolative content, and a synthetic content respectively. In FIG. 17 to FIG. 19, the axis of ordinates reads levels into which a content is quantized.

FIG. 17 is an explanatory diagram concerning quantization of a main content into five gray levels. In FIG. 17, transverse solid lines define ranges designated by respective gray levels, and transverse dot lines indicate quantization levels resulting from quantization. The quantization levels shall equal the mean values of the ranges designated by respective gray levels, that is, the mean values between the minimum values and maximum values of the ranges designated by the respective gray levels.

For example, values of a content falling within a domain defined by the lowermost transverse solid line and the second lowermost transverse solid line are quantized to the smallest quantization level of 0. For example, assuming that a main content is quantized into five gray levels of an equal width, the width of one gray level corresponds to one-fifth of the range from the minimum value exhibited by the content, which has not yet been quantized, to the maximum value exhibited thereby. Consequently, the quantization level of 0 corresponds to one-tenth of the maximum value of the content that has not been quantized.

For example, values of a content falling within a range defined by the second lowermost solid line and the third lowermost solid line are quantized to the second smallest quantization level of 1. Values of the content falling within a range defined by the third lowermost solid line and the fourth lowermost solid line are quantized to the quantization level of 2 representative of the middle one of the five gray levels. Likewise, values of the content falling within a range defined by the third uppermost solid line and the second uppermost solid line are quantized to the second largest quantization level of 3. Values of the content falling within a range defined by the second uppermost solid line and the uppermost solid line are quantized to the largest quantization level of 4.

FIG. 18 is an explanatory diagram concerning quantization of an interpolative content, which is associated with the main content graphically shown in FIG. 17, into five gray levels. In FIG. 18, transverse dot-dash lines define ranges designated by respective gray levels, and transverse dot lines indicate quantization levels resulting from quantization. The widths of the respective gray levels into which an interpolative content is quantized are equal to the widths of the gray levels into which a main content is quantized. The ranges designated by the respective gray levels into which the interpolative content is quantized are deviated by a half of the width of each gray level from the ranges designated by the respective gray levels into which the main content is quantized. In other words, in the example shown in FIG. 18, the ranges designated by the respective gray levels into which the interpolative content is quantized are downward deviated by one-tenths of the maximum value exhibited by the interpolative content, which has not been quantized, from the ranges designated by the respective gray levels into which the main content is quantized.

For example, values of a content falling within a range defined by the lowermost dot-dash line and the second lowermost dot-dash line are quantized to the smallest quantization level of 0. The quantization level of 0 corresponds to a value of 0 exhibited by a content that has not been quantized.

For example, values of the content falling within a range defined by the second lowermost dot-dash line and the third lowermost dot-dash line are quantized to the second smallest quantization level of 1. Values of the content falling within a range defined by the third lowermost dot-dash line and the fourth lowermost dot-dash line are quantized to the quantization level of 2 representative of the middle gray level among the five gray levels. Likewise, values of the content falling within a range defined by the third uppermost dot-dash line and the second uppermost dot-dash line are quantized to the second largest quantization level of 3. Values of the content falling within a range defined by the second uppermost dot-dash line and the uppermost dot-dash line are quantized to the largest quantization level of 4.

Incidentally, values of a content falling outside the uppermost dot-dash line are quantized to the largest quantization level of 4.

FIG. 19 is an explanatory diagram concerning a content to be produced by synthesizing the main content shown in FIG. 17 and the interpolative content shown in FIG. 18. The transverse solid lines in FIG. 19 define ranges designated by respective gray levels in which the synthetic content is expressed.

A main content and an interpolative content are synthesized so that a mean value between a value of a unit (for example, a pixel) in which the main content is quantized and a value of a unit in which the interpolative content is quantized will be a value of a unit in which a synthetic content is quantized.

Ranges designated by respective gray levels into which an interpolative content is quantized are deviated from ranges, which are designated by respective gray levels into which a main content is quantized, by a half of the width of each gray level. Therefore, the width of each of ranges designated by respective gray levels to be exhibited by a synthetic content is a half of the width of each of the gray levels exhibited by the main content or interpolative content. In other words, for example, assuming that the main content or interpolative content is quantized into five gray levels, a content quantized into nine gray levels is produced as a result of synthesis.

To be more specific, for example, values of pixels constituting a main content and values of associated pixels constituting an interpolative content are added, and each of the sums is halved in order to work out a mean value. The mean values are then doubled, and (consequently, they equal the sums of the values of the pixels constituting the main content and the values of the pixels constituting the interpolative content) the resultant values are adopted as the values of pixels constituting a synthetic content. Incidentally, the mean values are doubled in order to make each quantization level integral because a mean value may be a value including 0.5.

Assuming that a value (quantization level) of a predetermined pixel (unit for quantization) contained in a main content is 0 and a value (quantization level) of an associated pixel (unit for quantization) contained in an interpolative content is 0, the mean value is 0. Consequently, a value (quantization level) of a pixel (unit for quantization) contained in a synthetic content is set to 0 that is the smallest quantization level.

Assuming that a value of a predetermined pixel contained in a main content is 0 and a value of an associated pixel contained in an interpolative content is 1, the mean value is 0.5. Consequently, a value of a pixel contained in a synthetic content is set to 1 that is the second smallest quantization level. Assuming that the value of the predetermined pixel contained in the main content is 1 and the value of the associated pixel contained in the interpolative content is 1, the mean value is 1. Consequently, the value of the pixel contained in the synthetic content is set to 2 that is the third smallest quantization level.

Likewise, assuming that a value of a predetermined pixel contained in a main content is N and a value of an associated pixel contained in an interpolative content is M, a value of a pixel contained in a synthetic content is calculated as $(N+M)/2 \times 2 = (N+M)$. The maximum value of N is 4 and the maximum value of M is 4. The maximum value of a value of a pixel contained in the synthetic content comes to 8.

Consequently, the gray levels into which pixels constituting a synthetic content are classified are nine gray levels ranging from level 0 to level 8.

As mentioned above, a main content and an interpolative content are synthesized so that a mean value between a value of a unit (for example, a pixel) in which a main content is quantized and a value of a unit in which an interpolative content is quantized will be adopted as a value of a unit in which a synthetic content is quantized. Consequently, a content exhibiting nearly a double number of gray levels is produced. Eventually, quantization noise is halved.

Figure 20:
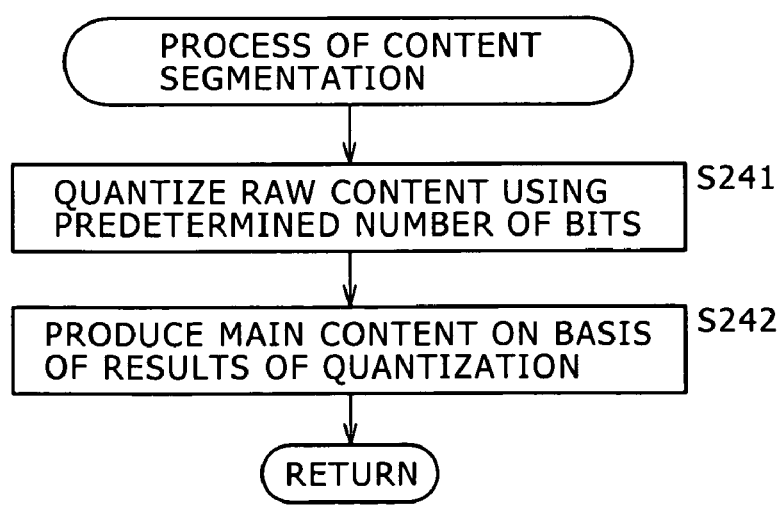
FIG. 20 is a flowchart describing another example of the details of a process of raw content segmentation performed at step S41.

FIG. 20 is a flowchart describing another example of the details of a process of raw content segmentation executed at step S41. At step S241, the segmentation unit 51 quantizes a raw content using a predetermined number of bits (number of gray levels). At step S242, the segmentation unit 51 produces a main content on the basis of the results of the quantization. The process is then terminated.

Figure 21:
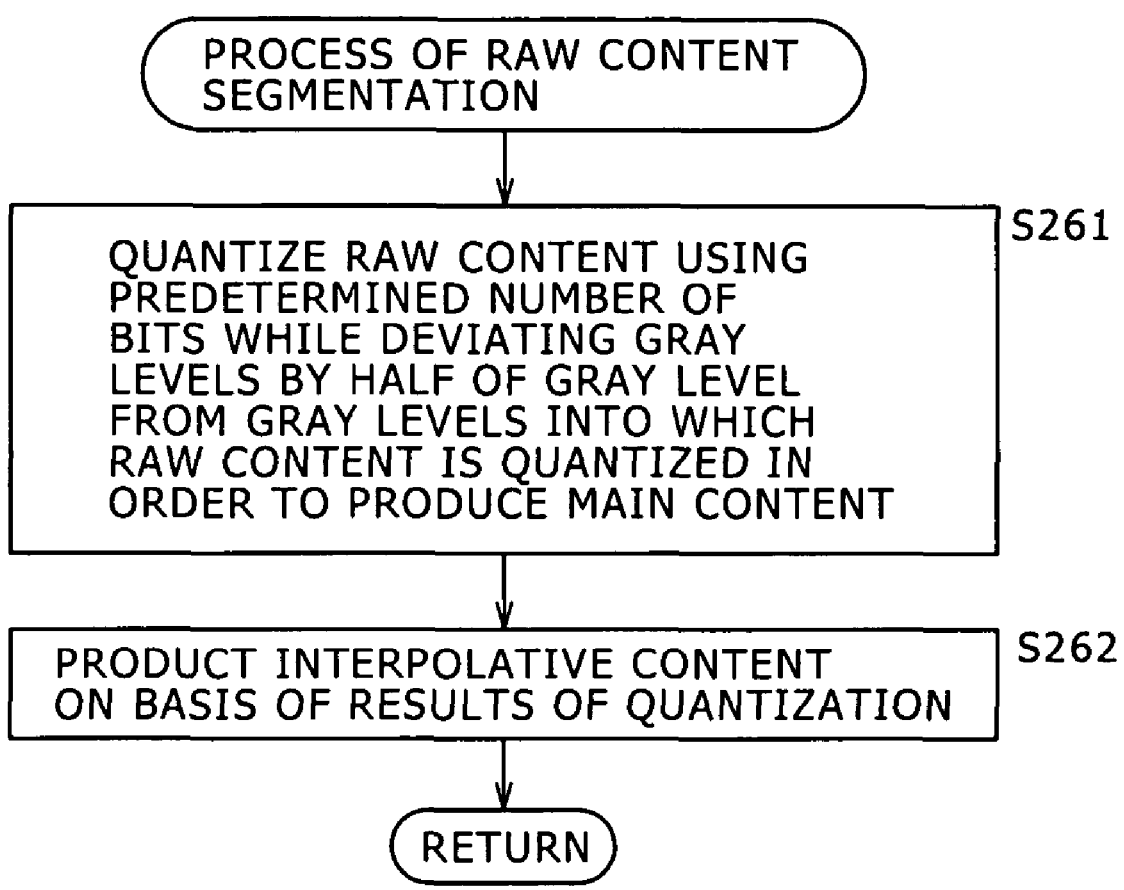
FIG. 21 is a flowchart describing another example of a process of raw content segmentation performed at step S82.

FIG. 21 is a flowchart describing another example of the details of a process of raw content segmentation executed at step S82. At step S261, the segmentation unit 71 quantizes a raw content using the same number of bits as the number of bits, which is used to produce a main content at step S241, while deviating gray levels by a half of a gray level from gray levels into which the raw content is quantized in order to produce the main content at step S241. At step S262, the segmentation unit 71 produces an interpolative content on the basis of the results of the quantization. The process is then terminated.

Figure 22:
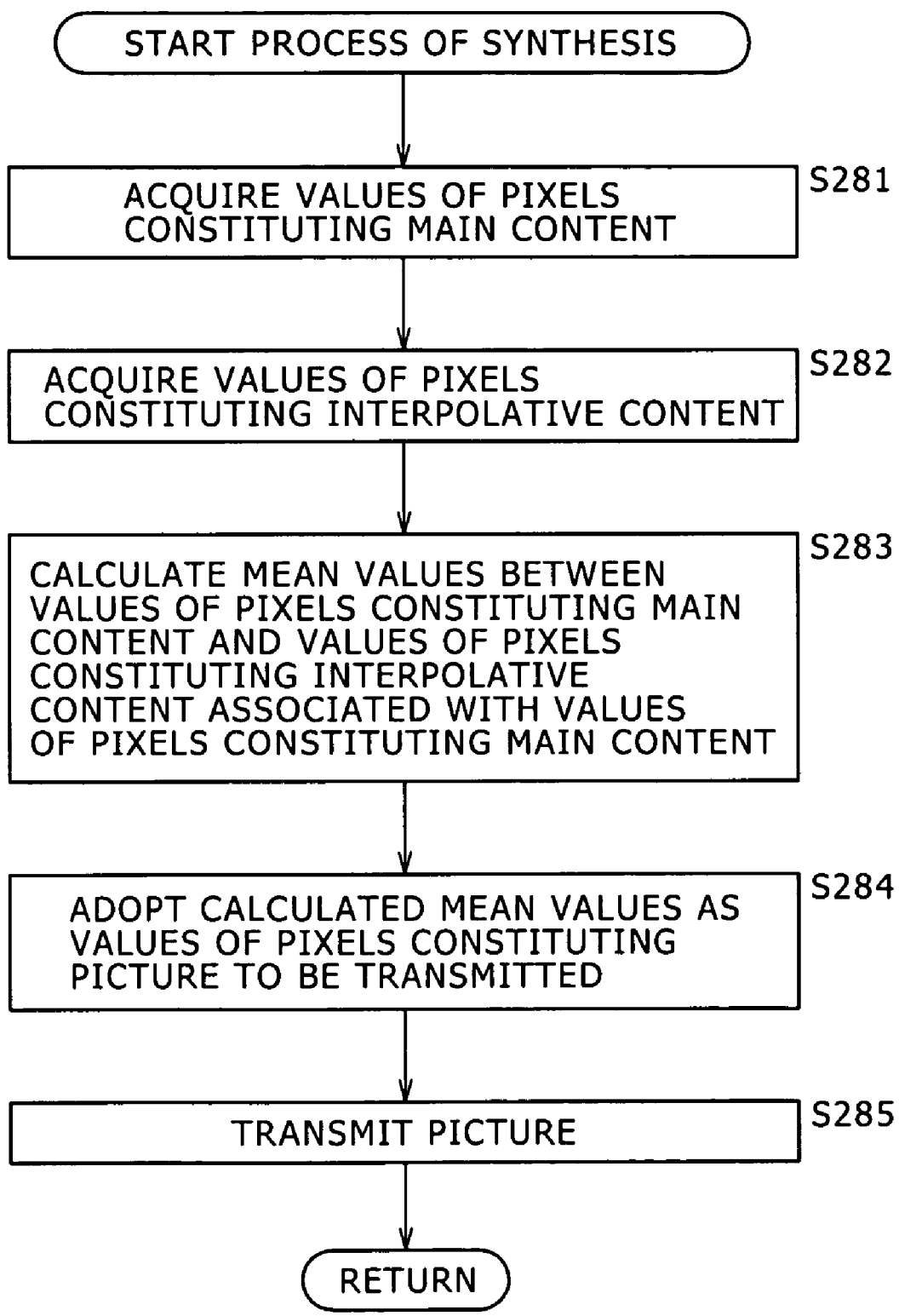
FIG. 22 is a flowchart describing another example of the details of a process of synthesis performed at step

FIG. 22 is a flowchart describing another example of the details of a process of synthesis executed at step S185. At step S281, the synthesis unit 32 acquires values of pixels constituting a decoded main content. At step S282, the synthesis unit 32 acquires values of pixels constituting a decoded interpolative content.

At step S283, the synthesis unit 32 calculates mean values between the values of the pixels constituting the main content and the values of the pixels that constitute the interpolative content and that are associated with the pixels of the main content.

At step S284, the synthesis unit 32 adopts the calculated mean values as values of pixels constituting a produced picture. At step S285, the synthesis unit 32 transmits the synthetic picture. The process is then terminated.

As mentioned above, an interpolative content that is produced by quantizing a raw content using a predetermined number of bits (number of gray levels) while deviating gray levels by a half of a gray level from gray levels into which the raw content is quantized in order to produce a main content is synthesized with the main content. Consequently, a content exhibiting a nearly double number of gray levels can be produced.

Next, a description will be made of production and synthesis of a main content and an interpolative content which are mutually interpolated in a temporal direction.

For example, a main content can be constructed by sampling every n+1-th frame out of frames constituting a raw content. In this case, an interpolative content can be constructed using frames of the raw content that are not sampled in order to produce the main content.

To be more specific, for example, a main content is constructed by sampling every other frame out of frames constituting a raw content. An interpolative content is constructed using the remaining frames of the raw content.

Figure 23:
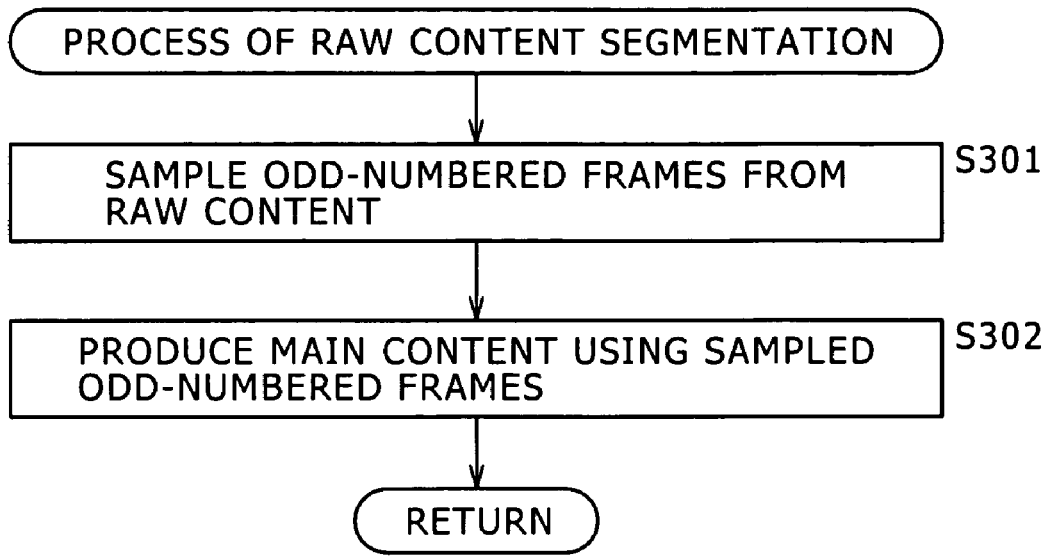
FIG. 23 is a flowchart describing still another example of the details of the process of raw content segmentation performed at step S41.

FIG. 23 is a flowchart describing still another example of the details of a process of raw content segmentation executed at step S41. At step S301, the segmentation unit 51 samples odd-numbered frames from a raw content. For example, at step S301, the segmentation unit 51 samples the first, third, fifth, seventh, and ninth frames, etc. from the raw content.

At step S302, the segmentation unit 51 produces a main content using the sampled odd-numbered frames. The process is then terminated.

Figure 24:
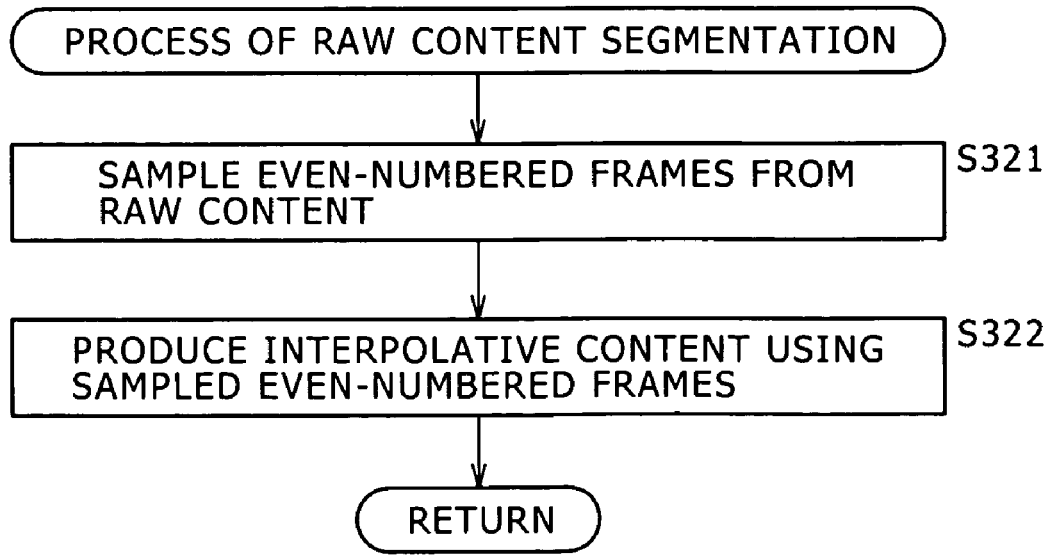
FIG. 24 is a flowchart describing still another example of the details of the process of raw content segmentation performed at step S82.

FIG. 24 is a flowchart describing still another example of the details of a process of raw content segmentation executed at step S82. At step S321, the segmentation unit 71 samples even-numbered frames from a raw content. For example, at step S321, the segmentation unit 71 samples the second, fourth, sixth, eighth, and tenth frames, etc. of the raw content.

At step S322, the segmentation unit 71 produces an interpolative content using the sampled even-numbered frames. The process is then terminated.

Figure 25:
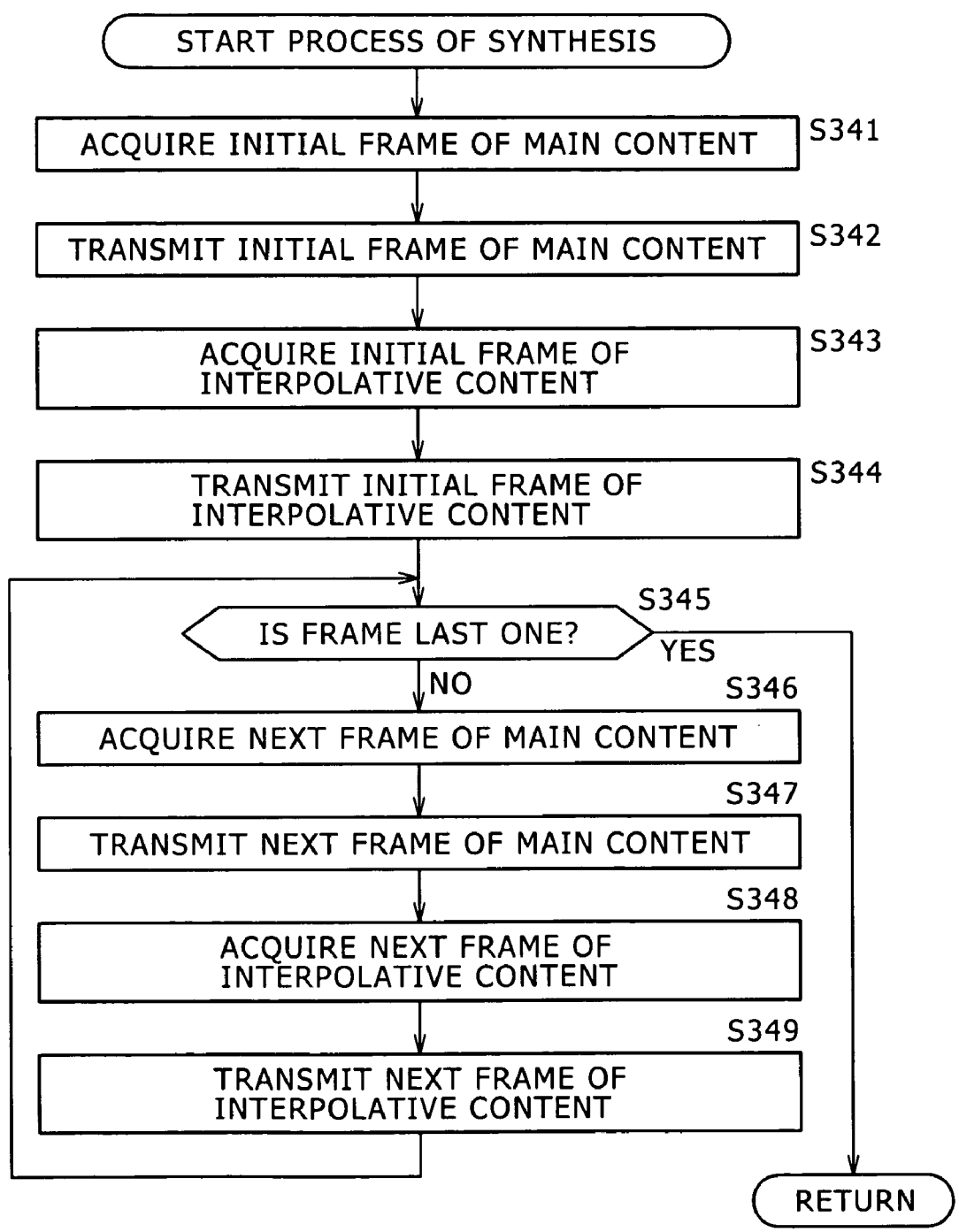
FIG. 25 is a flowchart describing still another example of the details of the process of synthesis performed at step S185.

FIG. 25 is a flowchart describing still another example of the details of a process of synthesis executed at step S185. At step S341, the synthesis unit 32 acquires an initial frame of a decoded main content. At step S342, the synthesis unit 32 transmits the initial frame of the main content as a frame of a synthetic content. Namely, at step S342, the synthesis unit 32 transmits the initial frame of the raw content.

At step S343, the synthesis unit 32 acquires the initial frame of a decoded interpolative content. At step S344, the synthesis unit 32 transmits the initial frame of the interpolative content as a frame of the synthetic content. Namely, at step S344, the synthesis unit 32 transmits the second frame of the raw content.

At step S345, the synthesis unit 32 decides whether the transmitted frame is the last frame. If a decision is made that the frame is not the last frame, the process proceeds to step S346. The synthesis unit 32 acquires the next frame of the decoded main content. At step S347, the synthesis unit 32 transmits the next frame of the main content as a frame of the synthetic content.

At step S348, the synthesis unit 32 acquires the next frame of the decoded interpolative content. At step S349, the synthesis unit 32 transmits the next frame of the interpolative content as a frame of the synthetic content. The process returns to step S345, and the decision making is repeated.

Until the last frame is transmitted, frames of the main content and frames of the interpolative content are transmitted alternately.

Steps S345 to S349 are sequentially repeated, whereby the synthesis unit 32 sequentially transmits the third, fourth, fifth, and sixth frames, etc. of the raw content.

If a decision is made at step S345 that the transmitted frame is the last frame, the process is terminated.

As mentioned above, an interpolative content made up of frames that alternate with adjacent frames constituting a main content is synthesized with the main content. Consequently, a content having a double number of frames can be produced.

Next, a description will be made of another main content and interpolative content which are mutually interpolated in a spatial direction.

For example, a main content may be constructed using pixels obtained by sampling every n+1-th pixel out of pixels constituting a raw content. In this case, an interpolative content may be constructed using pixels of the raw content that are not sampled in order to produce the main content.

To be more specific, for example, a main content is constructed with pixels obtained by sampling every other pixel out of pixels, which constitute a raw content, in a transverse or longitudinal direction. An interpolative content may be constructed with the remaining pixels of the raw content.

Figure 26:
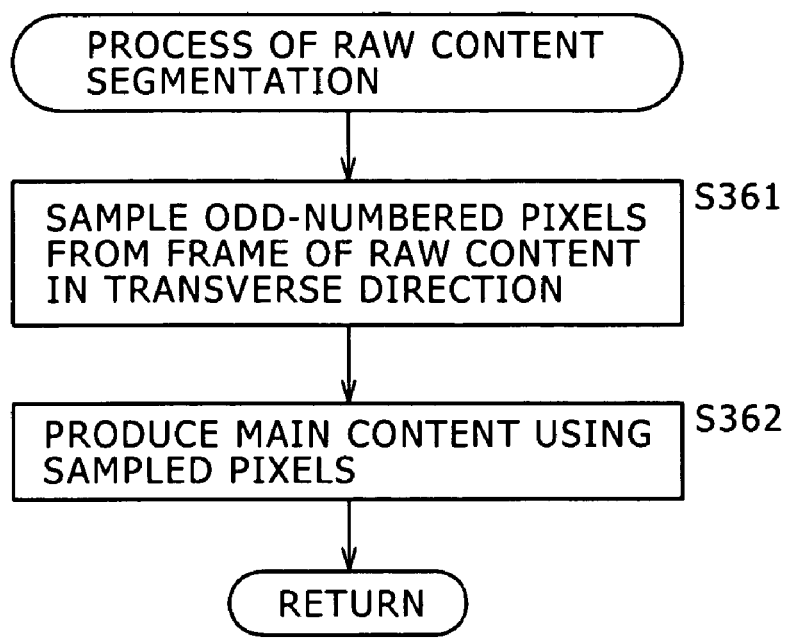
FIG. 26 is a flowchart describing still another example of the details of the process of raw content segmentation performed at step S41.

FIG. 26 is a flowchart describing still another example of the details of a process of raw content segmentation executed at step S41. At step S361, the segmentation unit 51 samples odd-numbered pixels from a frame of a raw content in a transverse direction. For example, at step S361, the segmentation unit 51 samples the first, third, fifth, seventh, and ninth pixels, etc. from the frame of the raw content in that order from the leftmost end of the frame.

At step S362, the segmentation unit 51 produces a main content using the sampled pixels. The process is terminated.

Figure 27:
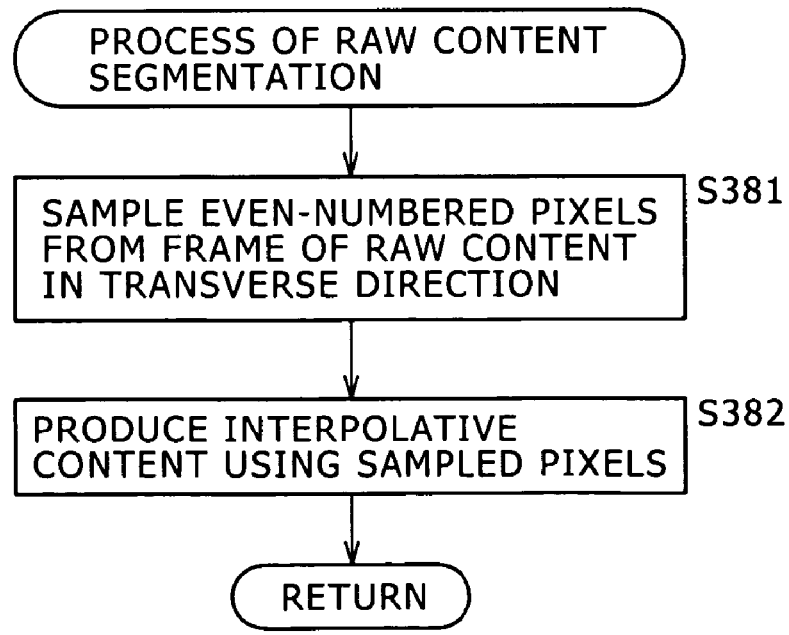
FIG. 27 is a flowchart describing still another example of the details of the process of raw content segmentation performed at step S82.

FIG. 27 is a flowchart describing still another example of the details of a process of raw content segmentation executed at step S82. At step S381, the segmentation unit 71 samples in a transverse direction even-numbered pixels from a frame of a raw content. For example, at step S381, the segmentation unit 71 samples the second, fourth, sixth, eighth, and tenth pixels, etc. from the frame of the raw content in that order from the leftmost end of the frame.

At step S382, the segmentation unit 71 produces an interpolative content using the sampled pixels. The process is then terminated.

Incidentally, assuming that a raw content is an analog picture, the interpolative content production equipment 12 may sample points in the raw content that are deviated in a transverse direction from sampling points, which are sampled in order to produce a main content, so as to produce a digital interpolative content. In this case, the passband of a pre-filter (anti-aliasing filter) on a stage preceding A/D conversion is preferably adjusted in order to pass high-frequency components of a picture so that significant components of the picture will be contained in an interpolative content rather than in a main content.

Figure 28:
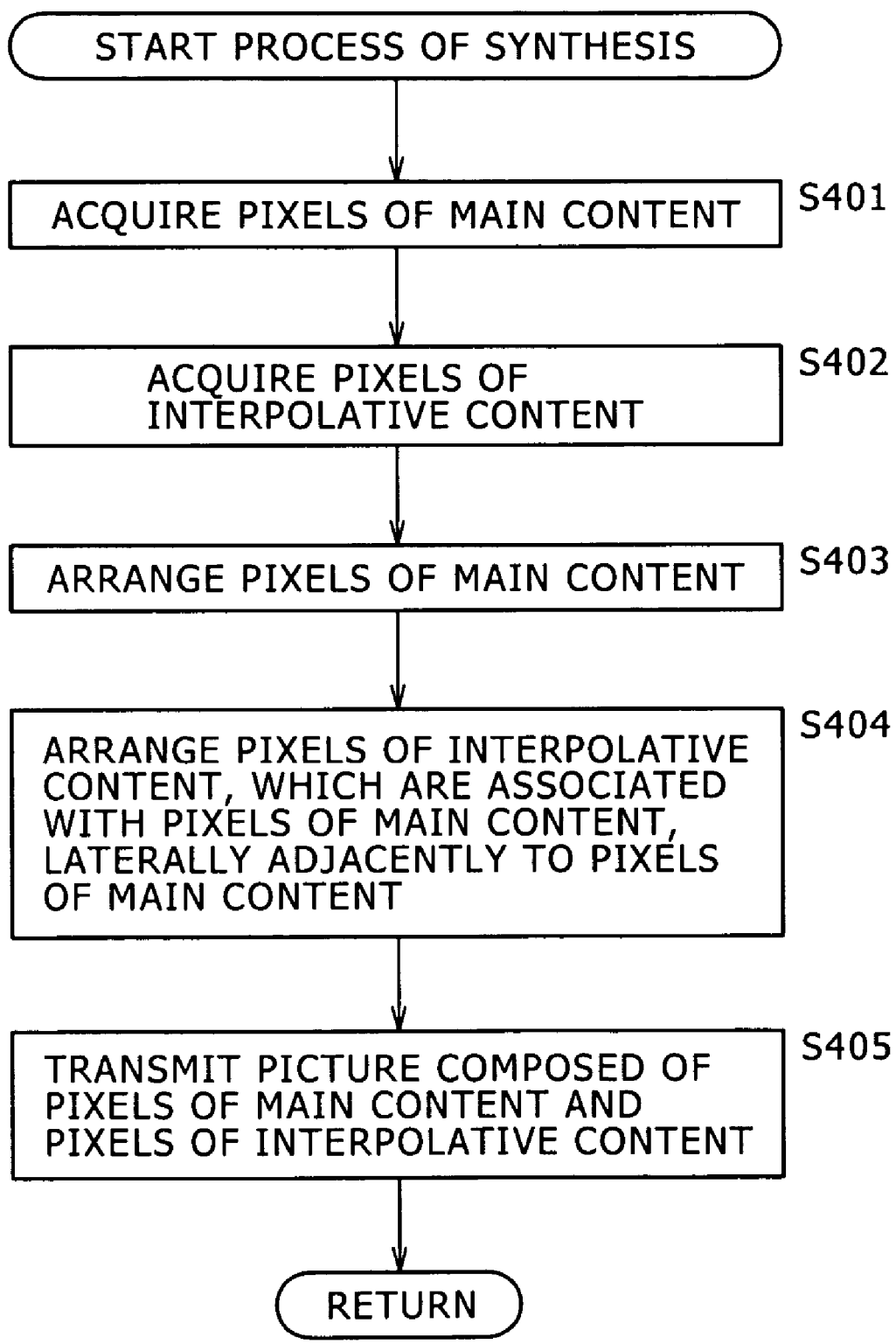
FIG. 28 is a flowchart describing still another example of the details of the process of synthesis performed at step S185.

FIG. 28 is a flowchart describing still another example of a process of synthesis executed at step S185. At step S401, the synthesis unit 32 acquires pixels of a decoded main content. At step S402, the synthesis unit 32 acquires pixels of a decoded interpolative content.

At step S403, the synthesis unit 32 arranges the pixels of the main content in a picture that is a synthetic content. At step S404, the synthesis unit 32 arranges the pixels of the interpolative content, which are associated with the pixels of the main content, laterally adjacently to the pixels of the main content. For example, at step S404, the synthesis unit 32 arranges the first pixel, which is the leftmost pixel of the interpolative content, by the right side of the first pixel of the main content that is the leftmost pixel thereof. Likewise, the i-th leftmost pixel of the interpolative content is arranged by the right side of the i-th leftmost pixel of the main content (where i denotes an integer equal to or larger than 2). Thus, the synthesis unit 32 arranges pixels, which are contained in a main content or an interpolative content and correspond to the first, second, third, fourth, and fifth leftmost pixels, etc. sampled from a frame of a raw content, in the same manner as they are arranged in the raw content.

At step S405, the synthesis unit 32 transmits a picture that is made up of the pixels contained in the main content and those contained in the interpolative content. The process is then terminated.

As mentioned above, a content having a double number of pixels can be produced by synthesizing an interpolative content, which is made up of pixels that alternate with adjacent pixels constituting a main content, with the main content.

For example, assuming that a main content is first broadcasted according to the SDTV standard and an interpolative content is rebroadcasted according to the SDTV standard, when both the main content and interpolative content are received, a content conformable to the HDTV standard can be obtained. In this case, the broadcasted main content alone may be received first and reproduced according to the SDTV standard. Even when the main content is not received, only the rebroadcasted interpolative content whose contents are identical to those of the main content may be received and reproduced according to the SDTV standard.

As mentioned above, a content of higher quality can be produced without the necessity of expanding the broadcast band or communication band and the necessity of modifying the format supported by the recording medium 17.

One interpolative content has been described to be synthesized with one main content. The present invention is not limited to this mode. Alternatively, an arbitrary number of interpolative contents, that is, two or more interpolative contents may be synthesized with one main content. For example, the first interpolative content is a picture that is formed according to the interlaced scanning and made up of lines which alternate with adjacent lines constituting a main content that is a picture formed according to the interlaced scanning. The associated lines of the first interpolative content are arranged alternately with the adjacent lines of the main content, whereby the main content and first interpolative content are synthesized. Furthermore, the second interpolative content and third interpolative content are pictures that are formed according to the interlaced scanning and each made up of lines which alternate with adjacent lines of a content resulting from synthesis. The associated lines of the second interpolative content and the associated lines of the third interpolative content are arranged alternately with the adjacent lines of the content resulting from the synthesis. Consequently, the second interpolative content and third interpolative content are synthesized with the content having the main content synthesized with the first interpolative content.

A content of higher quality can thus be produced.

Moreover, contents may be synthesized in order to combine interpolation in a spatial direction, interpolation in a temporal direction, and interpolation of gray levels represented by quantization levels with one another.

Incidentally, a description has been made by taking a content, which is a picture, for instance. The content is not limited to a picture but may be anything significant to a user such as sounds or any other kind of data. For example, assuming that the content is sounds, a main content may be sampled at 44.1 kHz and an interpolative content may be sampled at 44.1 kHz with sampling points deviated from those at which the main content is sampled. The sampled main content and interpolative content may be synthesized in order to produce a content that exhibits a frequency corresponding to a sampling rate of 96 kHz. Moreover, for example, assuming that the content is sounds, an interpolative content may include sounds falling within a channel different from a channel within which sounds of the main content fall, or may include sounds falling within a frequency band (for example, a band from 20 Hz to 80 Hz or from 16 kHz to 20 kHz) different from a frequency band (for example, a band from 80 Hz to 16 kHz) within which the sounds of the main content fall.

For example, assuming that a content is data to be manipulated in a navigation system, a main content that is vector data based on which a map is rendered and an interpolative content that is made up of vector data with which the vector data of the main content is interpolated may be synthesized in order to produce a content that expresses a smoother map.

Moreover, an analog main content and an analog interpolative content that has the same contents as the main content may be synthesized in order to calculate a mean between signals expressing the same region. In this case, noise contained in a content can be minimized.

The terminal equipment 13 has been described to be realized as, for example, a stationary video recorder or personal computer. The present invention is not limited to the terminal equipment. Any terminal equipment will do as long as it can acquire and synthesize contents. For example, a navigation system, a handheld video recorder, or a portable cellular phone will do.

As mentioned above, when a main content or an interpolative content is received or read from a recording medium, a content can be acquired. Moreover, a first content and a second content may be synthesized so that the first content will be interpolated in a spatial or temporal direction; the first content will be interpolated in the spatial or temporal direction by producing a second content with which gray levels into which the first content is quantized are interpolated; or the gray levels into which the first content is quantized will be interpolated. In this case, a content of higher quality can be produced readily.

Furthermore, when an interpolative content is transmitted or written in a recording medium, a content can be provided. Moreover, when information processing equipment that synthesizes a first content and a second content so that: the first content will be interpolated in a spatial or temporal direction; the first content will be interpolated in the spatial or temporal direction by producing the second content with which gray levels into which the first content is quantized are interpolated; or the gray levels into which the first content is quantized will be interpolated is provided with the second content, the information processing equipment can readily produce a content of higher quality.

Figure 29:
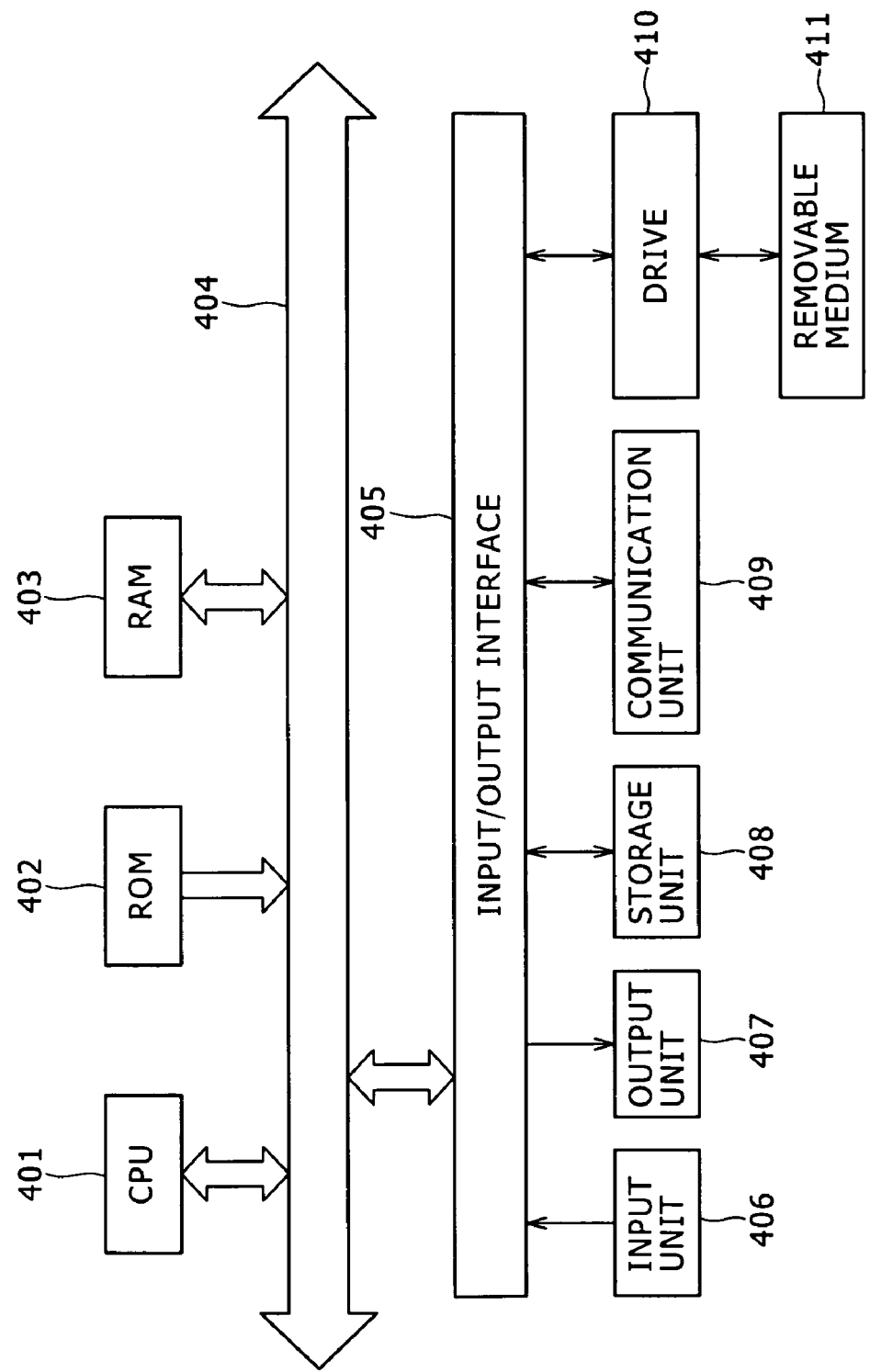
FIG. 29 is a block diagram showing an example of the configuration of a personal computer.

FIG. 29 is a block diagram showing an example of the configuration of a personal computer that runs programs so as to execute the aforesaid series of processes. A central processing unit (CPU) 401 executes various processes according to the programs stored in a read-only memory (ROM) 402 or a storage unit 408. Programs to be run by the CPU 401 and data are appropriately stored in a random access memory (RAM) 403. The CPU 401, ROM 402, and RAM 403 are interconnected over a bus 404.

Incidentally, a cell described in "The Birth of a Cell" (Nikkei Electronics published from Nikkei Business Publications Inc., Feb. 28, 2005, pp. 89-117) may be adopted as the CPU 401.

An input/output interface 405 is connected to the CPU 401 over the bus 404. An input unit 406 including a keyboard, a mouse, and a microphone and an output unit 407 including a display and a loudspeaker are connected to the input/output interface 405. The CPU 401 executes various processes in response to a command entered at the input unit 406. The CPU 401 transmits the results of a process to the output unit 407.

The storage unit 408 connected to the input/output interface 405 includes, for example, a hard disk, and holds programs to be run by the CPU 401 and various kinds of data. A communication unit 409 communicates with external equipment over the Internet, a local area network, or any other network.

Moreover, a program may be acquired via the communication unit 409 and stored in the storage unit 408.

When a removable medium 411 such as a magnetic disk, an optical disk, a magneto-optical disk, or a semiconductor memory is loaded into a drive 410 connected to the input/output interface 405, the removable medium is driven in order to acquire a program or data held therein. The acquired program or data is, if necessary, transferred to the storage unit 408 and stored therein.

The aforesaid series of processes may be executed by hardware or by software. When the series of processes is executed by software, programs constituting the software are installed from a program recording medium into a computer incorporated in dedicated hardware or a general-purpose personal computer that can execute various features when various programs are installed therein.

The program recording medium that holds the programs to be installed in a computer and capable of being run by the computer is realized with the removable medium 411 that is a packaged medium such as a magnetic disk (including a flexible disk), an optical disk (including a compact disk-read-only memory (CD-ROM), a digital versatile disk (DVD), and a magneto-optical disk), or a semiconductor memory, the ROM 402 in which the programs are temporarily or permanently stored, or a hard disk included in the storage unit 408. Storage of the programs in the program recording medium is achieved via the communication unit 409, which is an interface such as a router or a modem, by utilizing a wired or wireless communication medium such as a local area network, the Internet, or digital satellite broadcasting.

Steps described in the present specification and stated as programs to be stored in the program recording medium include not only pieces of processing that are time-sequentially performed according to stated sequences but also pieces of processing that may not always be performed time-sequentially but are performed in parallel with one another or independently of one another.

What is referred to as a system in the present specification signifies an entire system made up of a plurality of pieces of equipment.

It should be understood by those skilled in the art that various modifications, combinations, sub-combinations and alterations may occur depending on design requirements and other factors insofar as they are within the scope of the appended claims or the equivalents thereof.

What is claimed is:

1. Information processing equipment comprising:
   an acquisition unit that acquires a second content with which a first content is interpolated in a spatial or temporal direction or with which gray levels into which the first content is quantized are interpolated; and
   a synthesis unit that synthesizes the first content and second content so that the first content will be interpolated in the spatial or temporal direction or the gray levels into which the first content is quantized will be interpolated, wherein
   the acquisition unit acquires the second content that is quantized into reference gray levels different from reference gray levels into which the first content is quantized; and
   the synthesis unit synthesizes the first content and second content by adopting a mean value between a value of a unit in which the first content is quantized and a value of an associated unit, in which the second content is quantized, as a value of a unit for quantization.

2. The information processing equipment according to claim 1, wherein:
   the acquisition unit acquires the second content, which is a picture formed according to the interlaced scanning and made up of lines which alternate with adjacent lines constituting the first content that is a picture formed according to the interlaced scanning; and
   the synthesis unit synthesizes the first content and second content by arranging the associated lines of the second content alternately with the adjacent lines of the first content.

3. The information processing equipment according to claim 1, wherein:
   the acquisition unit acquires the second content made up of frames that alternate with adjacent frames constituting the first content; and
   the synthesis unit synthesizes the first content and second content by arranging the associated frames of the second content alternately with the adjacent frames of the first content.

4. The information processing equipment according to claim 1, wherein:
   the acquisition unit acquires the second content made up of pixels that alternate with adjacent pixels constituting the first content; and
   the synthesis unit synthesizes the first content and second content by arranging the associated pixels of the second content alternately with the adjacent pixels of the first content.

5. The information processing equipment according to claim 1, wherein the acquisition unit acquires the second content by receiving the broadcasted second content.

6. The information processing equipment according to claim 1, further comprising a transmission unit that transmits a request for the second content to a provision system, which provides the second content, over a network, wherein:
   the acquisition unit acquires the second content by receiving the second content that is transmitted from the provision system over the network in response to the request.

7. The information processing equipment according to claim 1, wherein the acquisition unit acquires the second content by reading the second content from a recording medium in which the second content is recorded.

8. The information processing equipment according to claim 1, further comprising a decision making unit that decides based on information, which signifies the association between the first content and second content and is appended to each of the first content and second content, whether the first content and second content have been acquired, wherein:

if a decision is made that the first content and second content have been acquired, the synthesis unit synthesizes the first content and second content.

9. An information processing method comprising the steps of:

acquiring a second content with which a first content is interpolated in a spatial or temporal direction or with which gray levels into which the first content is quantized are interpolated; and synthesizing the first content and second content and thereby causing the first content to be interpolated in the spatial or temporal direction or the gray levels into which the first content is quantized to be interpolated, wherein said acquiring acquires the second content that is quantized into reference gray levels different from reference gray levels into which the first content is quantized; and said synthesizing synthesizes the first content and second content by adopting a mean value between a value of a unit in which the first content is quantized and a value of an associated unit, in which the second content is quantized, as a value of a unit for quantization.

10. A non-transitory computer readable storage device having instructions that when executed by a computer processor cause a computer to execute steps of:

acquiring a second content with which a first content is interpolated in a spatial or temporal direction or with which gray levels into which the first content is quantized are interpolated; and synthesizing the first content and second content and thereby causing the first content to be interpolated in the spatial or temporal direction or the gray levels into which the first content is quantized to be interpolated, wherein the acquiring includes acquiring the second content that is quantized into reference gray levels different from reference gray levels into which the first content is quantized; and the synthesizing synthesizes the first content and second content by adopting a mean value between a value of a unit in which the first content is quantized and a value of an associated unit, in which the second content is quantized, as a value of a unit for quantization.

11. A provision system comprising:

a production unit that produces a second content with which a first content is interpolated in a spatial or temporal direction or with which gray levels into which the first content is quantized are interpolated; and a provision unit that provides information processing equipment, which synthesizes the first content and second content and thereby causing the first content to be interpolated in the spatial or temporal direction or the gray levels into which the first content is quantized to be interpolated, with the second content, wherein the production unit produces the second content that by quantization into reference gray levels different from reference gray levels into which the first content is quantized; and the provision unit synthesizes the first content and second content by adopting a mean value between a value of a unit in which the first content is quantized and a value of an associated unit, in which the second content is quantized, as a value of a unit for quantization.

12. The provision system according to claim 11, wherein the production unit produces the second content by sampling every other line out of lines constituting a picture formed according to the progressive scanning.

13. The provision system according to claim 11, wherein the production unit produces the second content by quantizing a picture into reference gray levels different from reference gray levels into which the first content is quantized.

14. The provision system according to claim 11, wherein the production unit produces the second content by sampling every other frame out of frames constituting a picture.

15. The provision system according to claim 11, wherein the production unit produces the second content by sampling every other pixel out of pixels constituting a picture.

16. The provision system according to claim 11, wherein the provision unit provides the information processing equipment with the second content by broadcasting the second content.

17. The provision system according to claim 11, further comprising a receiver that receives a request for the second content that is transmitted from the information processing equipment over a network, wherein:

the provision unit provides the information processing equipment with the second content by transmitting the second content over the network in response to the request.

18. The provision system according to claim 11, wherein the provision unit provides the information processing equipment with the second content by recording the second content in a recording medium that is read by the information processing equipment.

19. The provision system according to claim 11, further comprising an appending unit that appends information, which signifies the association with the first content, to the second content.

20. A provision method comprising the steps of:

producing a second content with which a first content is interpolated in a spatial or temporal direction or with which gray levels into which the first content is quantized are interpolated; and providing information processing equipment, which synthesizes the first content and second content and thereby causing the first content to be interpolated in the spatial or temporal direction or the gray levels into which the first content is quantized to be interpolated, with the second content, wherein the producing produces the second content that by quantization into reference gray levels different from reference gray levels into which the first content is quantized; and the providing synthesizes the first content and second content by adopting a mean value between a value of a unit in which the first content is quantized and a value of an associated unit, in which the second content is quantized, as a value of a unit for quantization.

21. A non-transitory computer readable storage device having instructions that when executed by a computer processor cause to execute steps of to execute the steps of:

producing a second content with which a first content is interpolated in a spatial or temporal direction or with which gray levels into which the first content is quantized are interpolated; and providing information processing equipment, which synthesizes the first content and second content and thereby causing the first content to be interpolated in the spatial or temporal direction or the gray levels into which the first content is quantized to be interpolated, with the second content, wherein the producing produces the second content that by quantization into reference gray levels different from reference gray levels into which the first content is quantized; and
the providing synthesizes the first content and second content by adopting a mean value between a value of a unit in which the first content is quantized and a value of an associated unit, in which the second content is quantized, as a value of a unit for quantization.

* * * * *